United States Patent

Chen et al.

[19]

[11] Patent Number: 5,998,891
[45] Date of Patent: Dec. 7, 1999

[54] ALTERNATOR WITH AN IMPROVED BATTERY TERMINAL ASSEMBLY

[75] Inventors: Jianing Chen, Oklahoma City; Michael D. Ballard, Edmond, both of Okla.

[73] Assignee: Unit Parts Company, Oklahoma City, Okla.

[21] Appl. No.: 08/914,665

[22] Filed: Aug. 19, 1997

[51] Int. Cl.$^6$ ................................................ H02K 11/00
[52] U.S. Cl. ........................ 310/68 R; 310/68 D; 310/71
[58] Field of Search ............................... 310/68 D, 68 R, 310/71; 363/145, 141

[56] References Cited

U.S. PATENT DOCUMENTS

| | | | |
|---|---|---|---|
| Re. 31,278 | 6/1983 | Schmider | 310/268 |
| 3,539,850 | 11/1970 | Sato | 310/68 D |
| 3,793,544 | 2/1974 | Baumgartner et al. | 320/17 |
| 4,065,686 | 12/1977 | Moore | 310/68 D |
| 4,087,713 | 5/1978 | Binder | 310/266 |
| 4,103,193 | 7/1978 | Ito | 310/68 D |
| 4,232,238 | 11/1980 | Saito et al. | 310/68 D |
| 4,313,262 | 2/1982 | Barnes et al. | 29/840 |
| 4,606,000 | 8/1986 | Steele et al. | 363/145 |
| 4,636,706 | 1/1987 | Bowman et al. | 322/28 |
| 4,873,962 | 10/1989 | Safranek | 123/599 |
| 4,948,997 | 8/1990 | Ohmitsu et al. | 310/113 |
| 5,158,912 | 10/1992 | Kellerman et al. | 437/218 |
| 5,214,563 | 5/1993 | Estes | 361/386 |
| 5,233,953 | 8/1993 | Whitehurst et al. | 123/198 E |
| 5,266,746 | 11/1993 | Nishihara et al. | 174/254 |
| 5,467,251 | 11/1995 | Katchmar | 361/719 |
| 5,518,964 | 5/1996 | DiStefano et al. | 437/209 |

OTHER PUBLICATIONS

Nicholas F. DeNardis, Delco CS–Series Heat Problems—Automotive Rebuilder Mar. 1995, pp. 46–51.
Mitsui Toatsu Chemicals, Inc. Tokyo, Japan, BN300 Heat Resistant Material brochure, 4 pages, date unknown.

Mitsui Toatsu Chemicals, Inc. Tokyo, Japan, Electronic Materials catalog, 12 pages, 1995.

Mitsui Toatsu Chemicals, Inc. Tokyo, Japan, "In Harmony with the Global Environment", 26 pages, date unknown.

Mitsui Toatsu Chemicals, Inc. Tokyo, Japan, Metal Quad Package (MQP) brochure, 2 pages, date unknown.

Mitsui Toatsu Chemicals, Inc. Tokyo, Japan, KOOL BASE® brochure, 8 pages, date unknown.

*Primary Examiner*—Clayton LaBalle
*Assistant Examiner*—Tran N. Nguyen
*Attorney, Agent, or Firm*—Dunlap, Codding & Roger

[57] ABSTRACT

The present invention relates to a replacement alternator constructed to replace an existing CS-130 alternator in a vehicle where the CS-130 alternator was disposed in a predetermined alternator space within the vehicle. The alternator space has a predetermined length, width and height. The alternator comprises a housing defining an alternator interior space. The housing is sized to fit within the predetermined alternator space. A rotor coil having a plurality of wire windings wound thereabout is disposed in the alternator interior space of the housing and rotatably supported by the housing. The wire windings of the rotor coil have an electrical current flowing therethrough for generating a rotating magnetic field as the rotor coil rotates. Means are provided for selectively rotating the rotor coil at a speed of at least 1600 revolutions per minute. The alternator includes a stator positioned in the rotating magnetic field generated by the rotor coil and supported by the housing. The stator carries a plurality of stator windings wound thereabout in a predetermined configuration to provide an output of the alternator. Means are provided within the alternator interior space of the housing for inducing a stabilized output current of at least about 43 amperes of current at about 1600 revolutions per minute of the rotor coil.

14 Claims, 11 Drawing Sheets

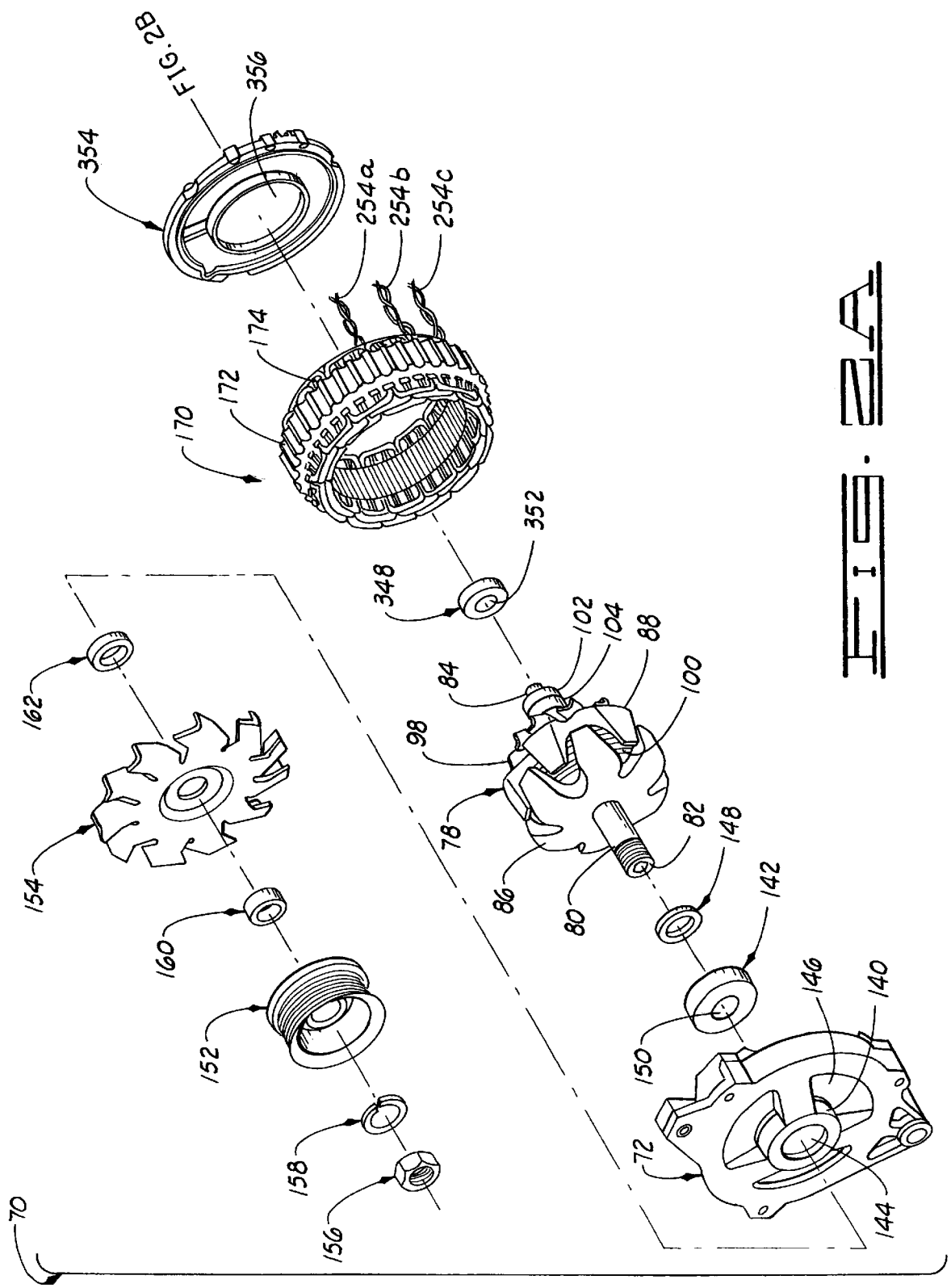

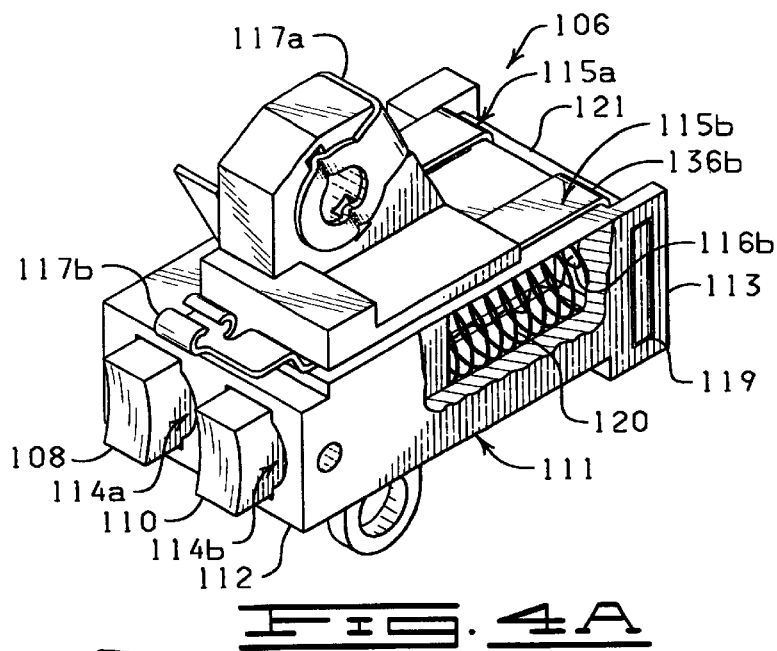
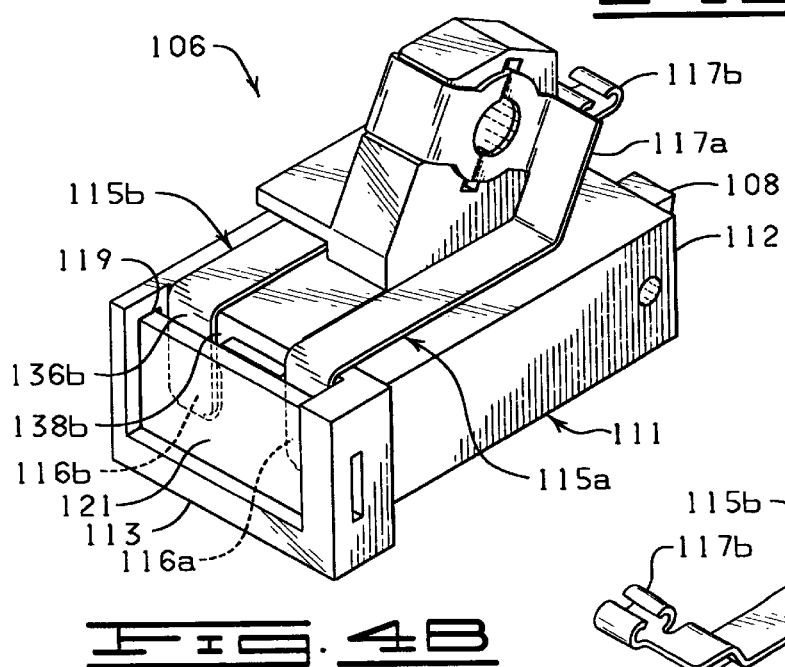
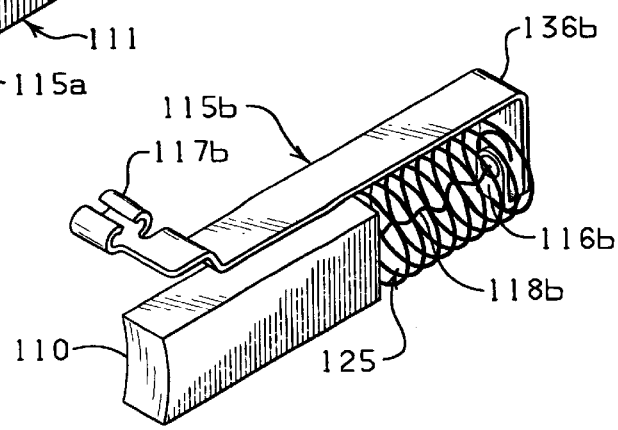

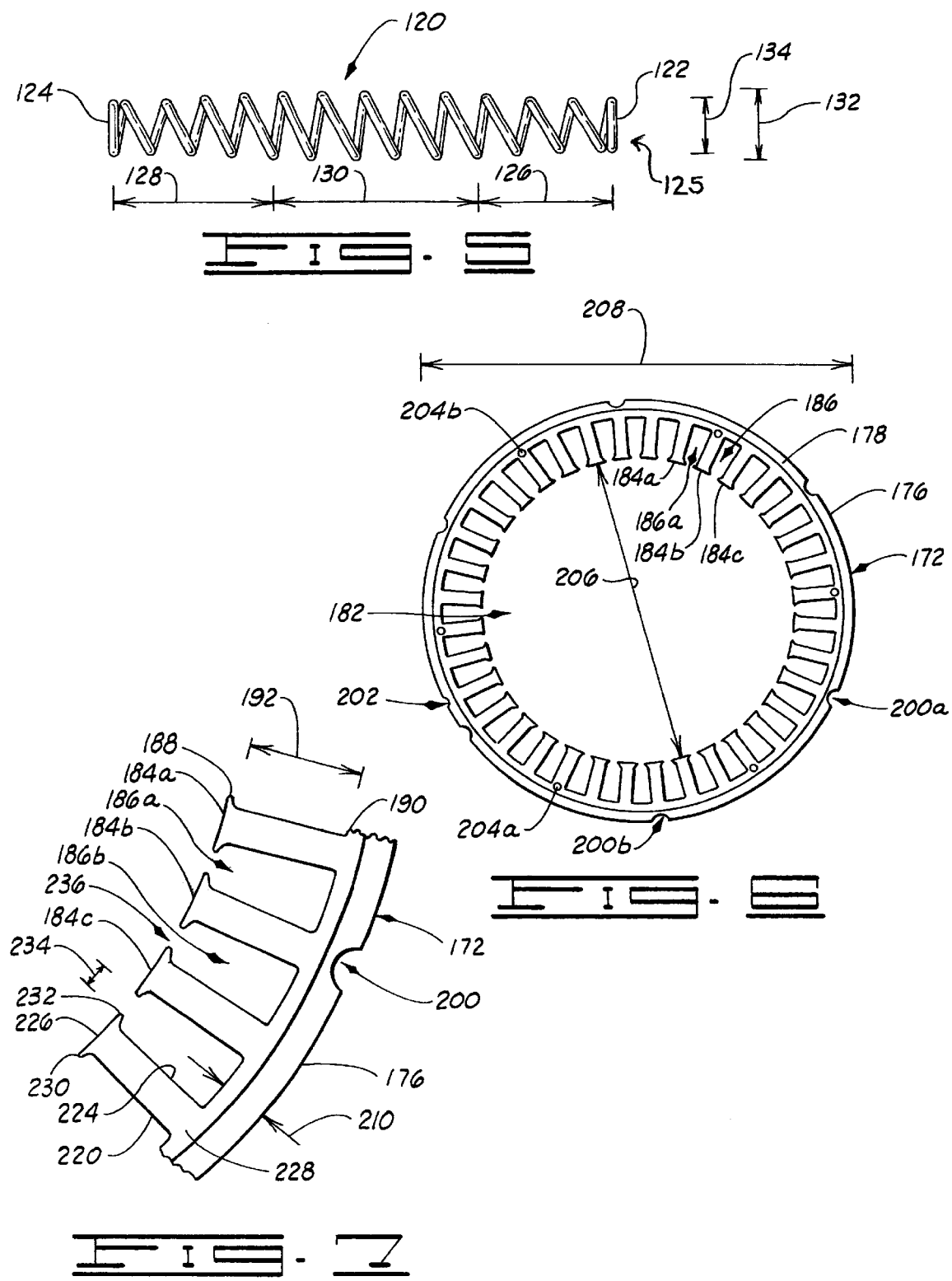

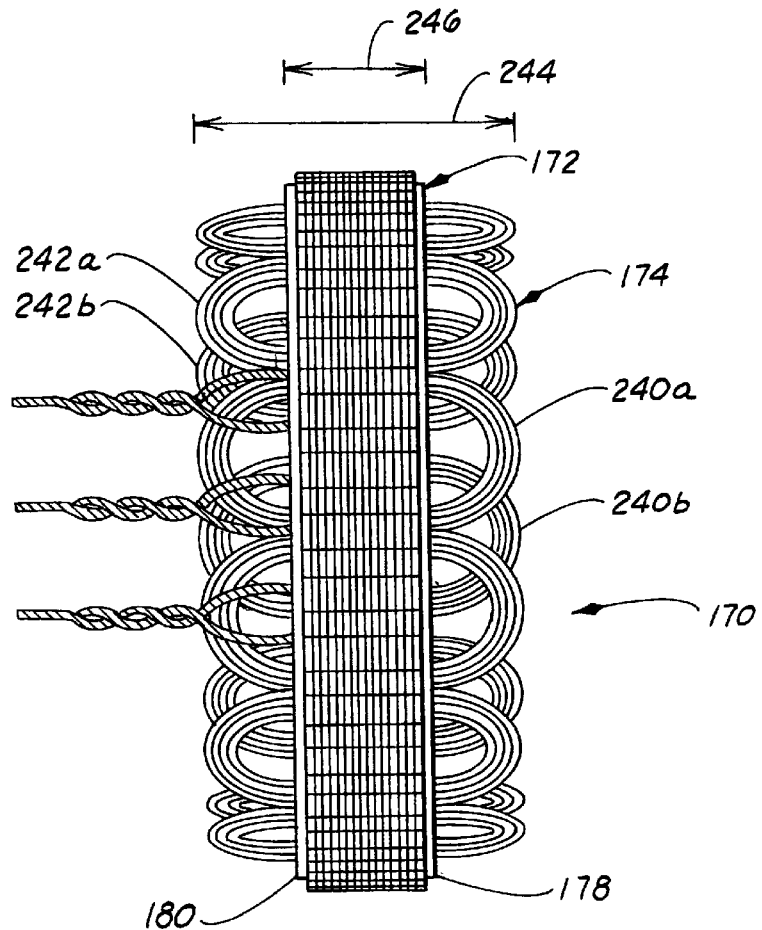
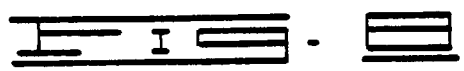
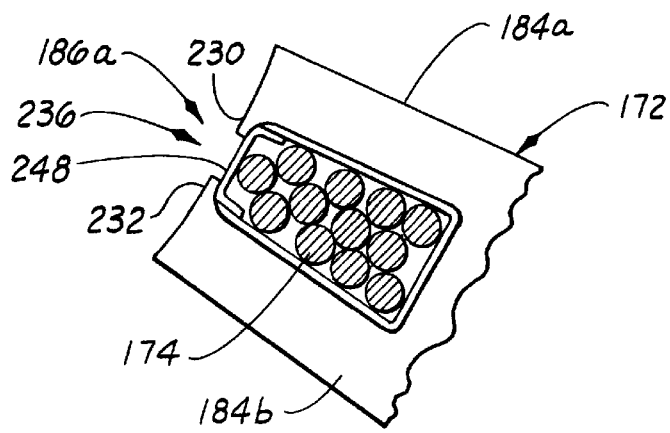

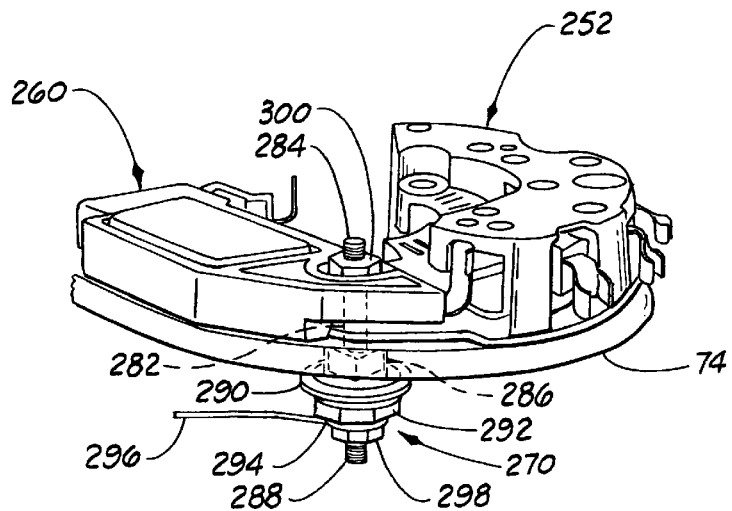
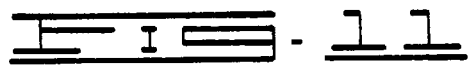
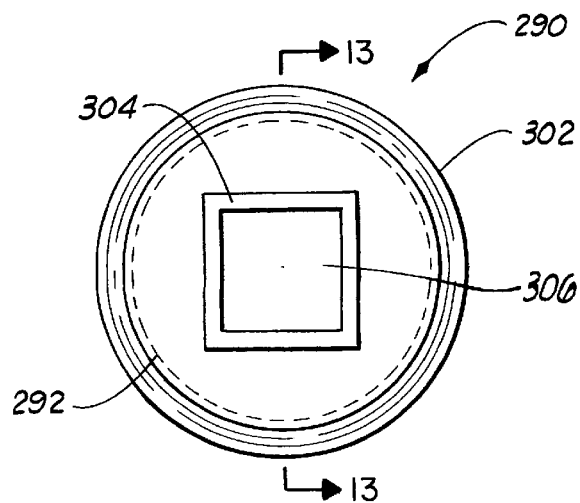
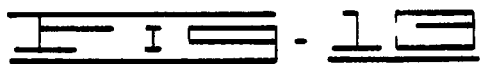
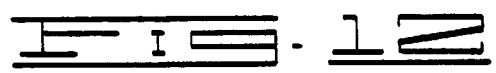

ALTERNATOR WITH AN IMPROVED BATTERY TERMINAL ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention.

The present invention relates generally to alternators and methods for producing alternators, and more particularly, but not by way of limitation, to an improved alternator having a higher electrical current output at low speeds of revolutions and having an improved battery terminal assembly and to methods of producing such an improved alternator.

2. Brief Description of the Prior Art.

Alternators for vehicles are well known in the art. The prior art alternators, such as the CS-130 alternator manufactured by General Motors, are presently provided with a housing defining an alternator interior space adapted to receive a rotor having a rotor coil. The rotor coil is rotated by the vehicle's engine and generates a moving magnetic field which induces an alternating current in three-phase stator windings disposed near the rotor coil. The speed at which the rotor coil rotates and the intensity of the rotor coil's magnetic field determine the voltage and current characteristics of the electricity generated by the prior art alternator.

Because the vehicle's engine speed varies considerably under normal driving conditions, the prior art alternators are provided with a voltage regulator which controls the intensity of the magnetic field generated by the rotor coil so that the alternator's output voltage remains within predefined limits. However, as the engine speed varies, the current of the electricity produced by the alternator also varies. That is, as the engine speed is reduced the electrical current produced by the prior art alternators is also reduced, and as the engine speed is increased the electrical current produced by the prior art alternators is also increased.

The output of the prior art alternators is electrically connected to the battery and electrical system of the vehicle to recharge the battery and to meet the current demands of the electrical system. However, if the prior art alternators are not generating a sufficient amount of electrical current to meet the demands of the electrical system then such electrical system draws electrical current from the battery to meet this deficiency. Because excess use of the battery shortens the useful life of same, it is undesirable for the battery to supply electrical current to the electrical system except during starting.

The prior art alternators typically produce a sufficient amount of electrical current to effectively charge the battery and to meet the demands of the electrical system when the prior art alternators are operating at high speeds. However, when the prior art alternators are operating at idle or low speeds, the prior art alternators produce an insufficient amount of electrical current to meet the demands of the electrical system. Thus, the battery supplies electrical current to the electrical system when the engine is operating at low speeds which shortens the useful life of the battery.

The voltage regulators of the prior art alternators are typically disposed in the alternator interior space of the housing where they are subjected to both external and internal heat. It should be noted that the number one cause of alternator failure is an overheated voltage regulator. The external heat described above is supplied to the voltage regulator by the engine and the internal heat described above is supplied to the voltage regulator by the electric current flowing through the voltage regulator.

While these prior art voltage regulators maintain the alternator's output within predefined limits, heat sinks provided on the back plate of the regulator do not effectively transfer the external and internal heat away from the voltage regulator. Thus, the voltage regulator overheats and is either destroyed or caused to malfunction.

To supply electricity to the rotor coil of the prior art alternators so that the rotor coil can generate the moving magnetic field, the rotor is provided with a pair of slip rings which are adapted to mate against a pair of corresponding brushes. The prior art alternators are provided with a brush assembly which includes a brush housing having a pair of brush chambers formed therein. A cylindrically shaped brush spring and one of the brushes is disposed in each of the brush chambers such that the spring force of each brush spring forces one of the brushes against the corresponding slip ring of the rotor.

Upon assembly of the prior art alternators, a portion of the brush may be inadvertently locked between one of the loops of the brush spring and the brush housing thereby preventing the brush spring from forcing the brush against the slip ring of the rotor coil. Thus, electricity is not supplied to the rotor coil and the alternator malfunctions.

The brushes in the prior art alternator are electrically connected to their respective electrical field circuits provided externally of the brush housing by flexible braided wires extending from the respective brushes to the field circuit connections. Because the brush housings of the prior art alternators provide no guarding or channeling mechanisms for the braided wires, these wires can be pinched, trapped, severed or otherwise damaged. If any of these conditions occur, the electrical connection to the field circuit can be lost and the prior art alternator will fail.

In addition, the prior art alternators are provided with a rectifier which rectifies the output of the alternator. The rectifier has a conductive surface with an opening formed therethrough. The voltage regulator of the prior art alternators is provided with a conductive surface which has an opening formed therethrough. The conductive surface of the voltage regulator is adapted to mate against the conductive surface of the rectifier such that the opening in the voltage regulator is aligned with the opening in the rectifier and such that electrical current flows between the conductive surfaces.

The voltage regulator and the rectifier are disposed in the alternator interior space of the housing of the alternator and a bolt is inserted through a plastic insulator, an opening formed in the housing of the alternator and the aligned openings in the voltage regulator and the rectifier such that a threaded end of the bolt extends from the voltage regulator into the alternator interior space. A nut is disposed on the threaded end of the bolt and is tightened to clamp the voltage regulator and the rectifier to the housing and to simultaneously clamp the mating conductive surfaces of the voltage regulator and the rectifier together.

However, the clamp formed from the nut and the bolt must be maintained at a precise predetermined tension.

When the clamp is too loose, a gap forms between the mating conducting surfaces of the voltage regulator and the rectifier. Electricity arcs across the gap and generates heat which can overheat the voltage regulator, the rectifier and/or the battery. When the clamp is too tight, the plastic insulator can break or crack and then the clamp becomes too loose and excess heat is generated as previously discussed.

The voltage regulator of the prior art alternator is provided with an electronic switch for controlling the field current in the rotor of the alternator. If a fault such as a short circuit occurs in the rotor, the current through the electronic switch increases significantly. This increased current can destroy the electronic switch and generate excess heat.

Finally, the prior art voltage regulators control a lamp in the automobile's dash for communicating an alternator failure to a driver. Conventionally, the means for controlling the lamp was disposed internally in the logic control unit. The logic control unit was destroyed in the event of a lamp short caused by the insulation being rubbed off a wire, or the incorrect wiring of the automobile or in the event that the ignition key was left in the lamp on-engine off position for an extended period of time, for example. This was costly in terms of dollars and inconvenience to the user.

To this end, a need has long existed for an improved alternator with a higher electrical current output at low speeds of revolutions and with increased heat dissipation qualities and decreased heat generation qualities. It is to such an improved alternator that the present invention is directed.

BRIEF SUMMARY OF THE INVENTION

The present invention relates to an alternator. The alternator includes a housing defining an alternator interior space. The housing has an opening formed therethrough. The housing is sized to fit within the predetermined alternator space within a vehicle.

The alternator also includes a rotor coil disposed in the alternator interior space. The rotor coil is rotatably supported by the housing and the rotor coil generates a magnetic field.

A plurality of stator windings is supported by the housing and positioned in the magnetic field for generating an AC output signal.

A voltage regulator is also disposed in the alternator interior space. The voltage regulator is electrically connected to the rotor coil for controlling the intensity of the magnetic field.

The alternator also includes a rectifier having an input and an output. The input of the rectifier is electrically connected to the stator windings such that the input of the rectifier receives the AC output signal generated by the stator windings.

A first clamping means is provided for exerting a first clamping force between the voltage regulator and the rectifier so as to clamp the voltage regulator and the rectifier together.

The alternator further includes an elongated shaft having a first end, a second end and a first end portion extending from the first end of the elongated shaft toward the second end of the elongated shaft. The first end portion of the elongated shaft is disposed through the opening in the housing and the elongated shaft is electrically and mechanically connected to the output of the rectifier.

The alternator also includes a second clamping means for exerting a second clamping force between the housing and the rectifier to clamp the rectifier to the housing.

The mechanical connection of the elongated shaft to the output of the rectifier isolates the first clamping force from the second clamping force such that if one of the first and second clamping forces becomes loose, the other one of the first and second clamping forces is not affected. This prevents the gap (as discussed above in the Background Of The Invention section) from forming in between the mating surfaces on the rectifier and the voltage regulator thereby preventing the generation of heat caused by electricity arcing across the gap. Thus, the present invention helps prevent the overheating of the rectifier and the voltage regulator so as to make the alternator more reliable.

Thus, the present invention is advantageous over the prior art battery terminals and, therefore, represents an advance in the state of the art relating to battery terminals.

BRIEF DESCRIPTION OF THE SEVERAL VIEWS OF THE DRAWING

FIG. 2A is an exploded perspective view of a portion of a replacement alternator which is constructed in accordance with the present invention.

FIG. 4A is a partially cutaway frontal perspective view of a brush assembly of the replacement alternator of FIGS. 2A and 2B.

FIG. 4B is a rear perspective view of the brush assembly depicted in FIG. 4A.

FIG. 4C is a perspective view of a brush spring disposed between a terminal end of a rigid conductor and a brush wherein the terminal end is connected to the brush via a flexible conductor extending through an opening provided through the brush spring.

FIG. 5 is a plan view of a brush spring of the brush assembly of FIG. 4.

FIG. 6 is a plan view of a stator lamination of a stator assembly of the replacement alternator of FIGS. 2A and 2B, the stator lamination having a plurality of slots formed therein.

FIG. 7 is a fragmental plan view of a portion of the stator lamination of FIG. 6.

FIG. 8 is a side view of a stator assembly of the replacement alternator of FIGS. 2A and 2B showing the stator assembly formed from a plurality of stator windings wound onto the stator lamination of FIGS. 6 and 7.

FIG. 9 is a fragmental plan view of a portion of the stator assembly of FIG. 8 showing 12 stator windings of #14AWG wire disposed in each slot formed in the stator lamination of FIG. 6.

FIG. 11 is a partial perspective view of the replacement alternator of FIGS. 2A and 2B showing a replacement battery terminal assembly which is constructed in accordance with the present invention.

FIG. 12 is a plan view of an insulator which is constructed in accordance with the present invention.

FIG. 13 is a cross-sectional view of the insulator of FIG. 12, taken along the lines 13—13 of FIG. 12.

DETAILED DESCRIPTION OF THE INVENTION

Figures 1, 10:
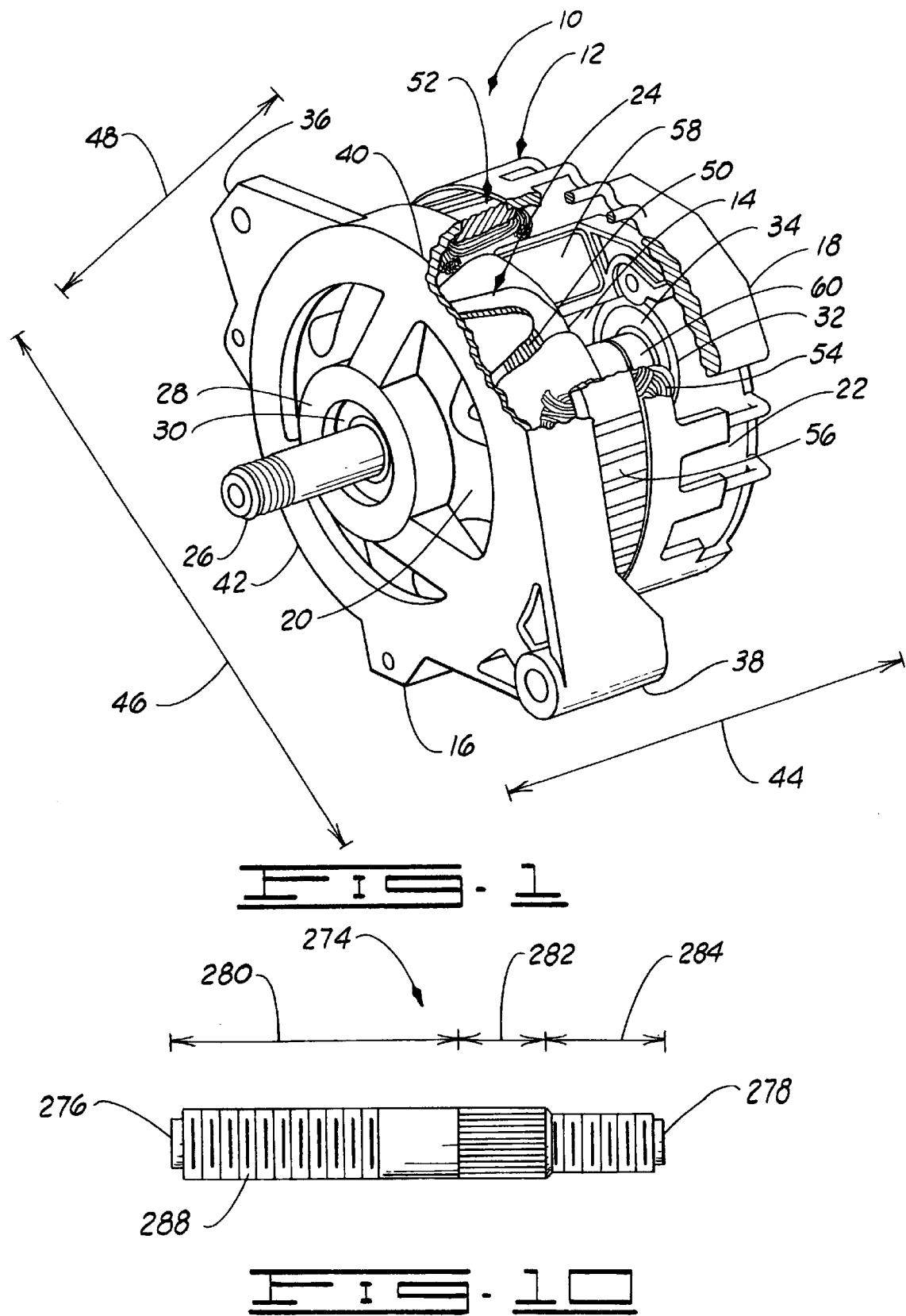
FIG. 1 is a partially cutaway perspective view of a prior art CS-130 alternator.
FIG. 10 is a plan view of an elongated shaft which is constructed in accordance with the present invention.

Referring now to the drawings and in particular to FIG. 1, a typical prior art or existing CS-130 alternator for use in a vehicle (not shown) is depicted. The prior art alternator 10 is provided with a housing 12 (FIG. 1) defining an alternator interior space 14. The housing 12 is provided with a drive end housing 16 and a slip ring end housing 18. The drive end housing 16 is provided with a plurality of air vents 22 formed therethrough and the slip ring end housing 18 is provided with a plurality of air vents 22 formed therethrough so that air can flow into the alternator interior space 14 through the air vents 20 in the slip ring end housing 18 and out of the alternator interior space 14 through the air vents 20 in the drive end housing 16.

The alternator interior space 14 of the housing 12 is adapted to receive a rotor 24 having a drive shaft 26. The drive end housing 16 is provided with a bearing well 28 adapted to receive a drive end bearing 30 for rotatably supporting one end of the drive shaft 26 of the rotor 24. The slip ring end housing 18 is provided with a bearing well 32 adapted to receive a slip ring end bearing 34 for rotatably supporting the other end of the drive shaft 26 of the rotor 24.

The housing of the prior art alternator has a first side 36, a second side 38, a top end 40, a bottom end 42, a predetermined length 44, a predetermined width 46, and a predetermined height 48. The predetermined length 44 of the housing 12 extends generally between an outermost portion of the bearing well 28 of the drive end housing 16 and an outermost portion of the bearing well 32 of the slip ring end housing 18. The predetermined width 46 of the housing 12 extends generally between the first side 36 and the second side 38 thereof. The predetermined height 48 of the housing 12 extends generally between the top end 40 and the bottom end 42 thereof.

In an installed position, the prior art alternator 10 is disposed in a predetermined alternator space (not shown) within the vehicle. The alternator space has a predetermined length, a predetermined width and a predetermined height which correspond to the length 44, width 46, and height 48, respectively, of the prior art alternator 10.

The rotor 24 (FIG. 1) of the prior art alternator 10 is provided with a rotor coil 50 in which a magnetic field is generated. The prior art alternator 10 is provided with a stator assembly 52 (FIG. 1) which surrounds the rotor coil 50 and is positioned in the magnetic field generated by the rotor coil 50. The stator assembly 52 has a plurality of stator windings 54 wound about a stator lamination 56, typically in a three-phase configuration.

The rotor coil 50 is rotated by the automobile's engine via the drive shaft 26 of the rotor 24 so that a current is induced in the stator windings 54 such that the prior art alternator 10 generates electricity. A voltage regulator 58 (FIG. 1) is provided in the alternator interior space 14 of the housing 12 and is electrically connected to the rotor coil 50 via slip rings 60 provided on the drive shaft 26 of the rotor 24 for controlling the intensity of the magnetic field generated by the rotor coil 50 such that the voltage output of the alternator 10 is maintained within predefined limits.

Figure 2B:
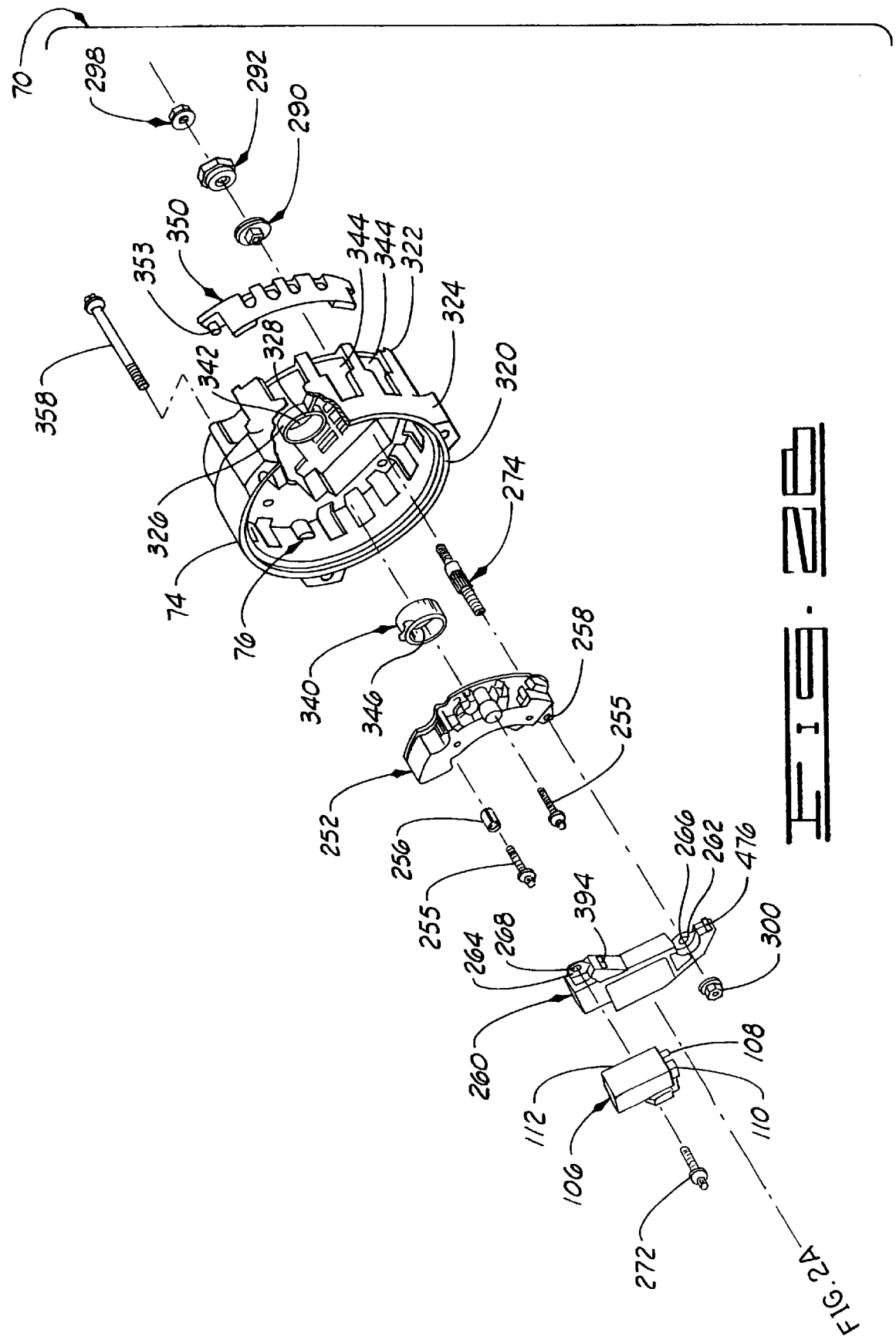
FIG. 2B is an exploded perspective view of another portion of the replacement alternator of FIG. 2A which is constructed in accordance with the present invention.

Shown in FIGS. 2A and 2B is an exploded view of a replacement alternator 70 which is constructed to replace the prior art CS-130 alternator 10 in the vehicle (not shown) where the existing CS-130 alternator 10 was disposed in the predetermined alternator space within the vehicle as discussed previously. In other words, the replacement alternator 70 has a predetermined length (not shown), a predetermined width (not shown) and a predetermined height (not shown) which are substantially identical in magnitude as the length 44, width 46, and height 48 of the prior art alternator 10. The replacement alternator 70 of the present invention provides a stabilized current output of at least about 43 amperes at about 1600 RPMs and typically outputs about 26 percent more electrical current at about 1600 RPMs than the prior art alternator 10 discussed above which permits the replacement alternator 70 of the present invention to meet or exceed the demands of the electrical system of the vehicle at low or idle speeds of the replacement alternator 70. Thus, the replacement alternator 70 of the present invention extends the useful life of the battery of the vehicle and thereby represents an advance in the state of the art relating to alternators for use in vehicles. It should be noted that the phrase "about 43 amperes" as used herein means an electrical current reading from about 41 amperes to about 45 amperes depending on the particular test stand which is being used to test the alternator 70.

The alternator 70 includes a drive end housing 72 (FIG. 2A) and a slip ring end housing 74 (FIG. 2B) which cooperate to form a housing. The drive end housing 72 and the slip ring end housing 74 define an alternator interior space 76 adapted to receive a rotor assembly 78 (FIGS. 2A and 3) which is constructed in accordance with the present invention.

Figure 3:
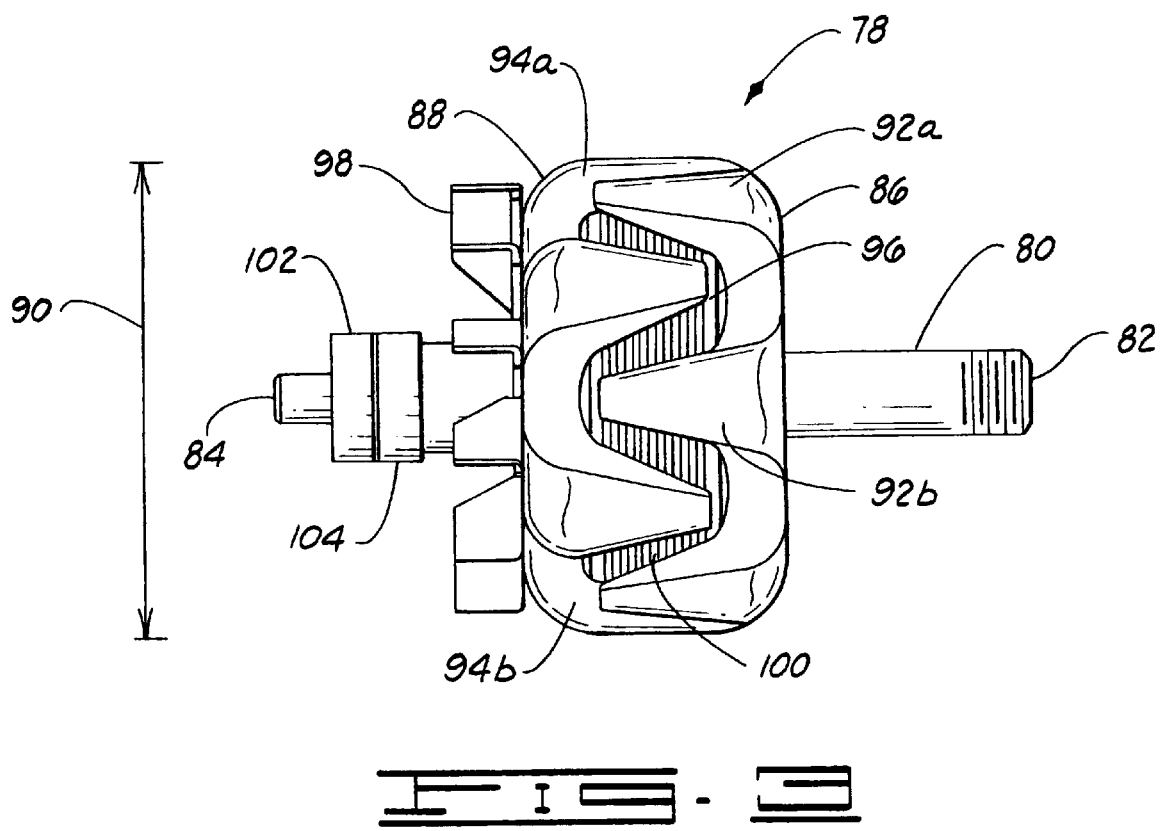
FIG. 3 is a plan view of a rotor assembly of the replacement alternator of FIGS. 2A and 2B.

The rotor assembly 78 is shown in more detail in FIG. 3. Referring now to FIG. 2A in combination with FIG. 3, the rotor assembly is provided with a drive shaft 80 having a drive end 82 and a slip ring end 84. A first hub 86 and a second hub 88 are fixedly secured to the drive shaft 80 in a spaced-apart relation. The first and second hubs 86 and 88 have a substantially similar diameter 90 which is typically about 95.91 millimeters to about 96.07 millimeters.

The rotor assembly 78 is provided with a plurality of circumferentially spaced first claw-pole fingers 92 which are supported by the first hub 86 and which extend from the first hub 86 towards the second hub 88. Only two of the first claw-pole fingers are labeled in FIG. 3 as 92a and 92b for purposes of clarity. The first claw-pole fingers 92 are constructed of a magnetically permeable material.

The rotor assembly 78 is further provided with a plurality of circumferentially spaced second claw-pole fingers 94 which are supported by the second hub 88 and which extend from the second hub 88 towards the first hub 86 such that the second claw-pole fingers 94 are interleaved with the first claw-pole fingers 92. Only two of the second claw pole fingers are labeled in FIG. 3 as 94a and 94b for purposes of clarity. The second claw-pole fingers 94 are constructed of a magnetically permeable material.

A rotor coil form 96 is fixedly supported by the drive shaft 80 of the rotor assembly 78 and is disposed generally between the first hub 86 and the second hub 88. The rotor coil form 96 is disposed radially intermediate or below the first and second claw-pole fingers 92 and 94. A rotor fan 98 is disposed on the drive shaft 80 and is connected to the second hub 88 of the rotor assembly 78.

The rotor coil form 96 is wound with a suitable length of wire 100 thereby forming a rotor coil. The rotor coil form 96 can be wound with between about 320 to about 340 turns of about 18 to about 20 gauge wire, and is desirably wound with between about 325 to about 338 turns of about 19 gauge wire and is more desirably wound with about 335 turns of about 19 gauge wire. The rotor coil form 96 can be wound with a GP-200 insulated copper magnet wire obtainable from Essex Group, Inc., of Fort Wayne, Ind.

It should be noted that the rotor coil form 96 of the present invention is wound with about 17 additional turns or windings of wire of a slightly larger gauge as the wire wound on the rotor coil form of the prior art alternator 10. These additional turns or windings of wire have contributed to the increased electrical output of the alternator 70 of the present invention and lower field current.

Winding systems and services for winding the wire 100 about the rotor coil form 96 are available from BACHI, L.P., Itasca, Ill.

To supply electricity to the wire 100 which is wound about the rotor coil form 96 so that the wire 100 generates a rotating magnetic field as the rotor assembly 78 rotates, the rotor assembly 78 is provided with a pair of slip rings 102 and 104 which are electrically connected to the wire 100 and which are disposed on the drive shaft 80, near the slip ring end 84 thereof.

To supply electricity to the slip rings 102 and 104 of the rotor assembly 78, the alternator 70 is provided with a brush assembly 106 (FIGS. 2B and 4) which is disposed in the alternator interior space 76 formed by the drive end housing 72 and the slip ring end housing 74. The brush assembly 106 includes a first brush 108 and a second brush 110. In an assembled condition of the alternator 70, the first brush 108 slidingly engages the slip ring 102 and the second brush 110 slidingly engages the slip ring 104 so as to provide electricity to the wire 100 which is wound about the rotor coil form 96.

The brush assembly 106 is shown in more detail in FIGS. 4A and 4B. Referring now to FIG. 2B in combination with FIGS. 4A and 4B, the brush assembly 106 is provided with a brush housing 111 having a first end 112, a second end 113, and a pair of brush chambers 114a and 114b. The brush chambers 114a and 114b openly communicate with the first end 112 of the brush housing 111 and extend into the brush housing 111 from the first end 112 thereof generally toward the second end 113 thereof. The brush assembly 106 is provided with two rigid conductors 115a and 115b matingly disposed on at least a portion of the exterior of the brush housing 111. Each of the rigid conductors 115a and 115b is provided with a first terminal end 116a and 116b, respectively, and a second terminal end 117a and 117b, respectively. The first terminal ends 116a and 116b of the rigid conductors 115a and 115b are each electrically connected to respective brushes 108 and 110 via flexible conductors 118a (not shown) and 118b. The first terminal ends 116a and 116b are identical in construction. The second terminal ends 117a and 117b are electrically connected to terminals (not shown) provided on the replacement alternator 70 in a similar manner as terminals (not shown) are provided on the prior art alternator 10 for supplying electrical power to the brushes 108 and 110 of the brush assembly 106.

The brush housing 111 is further provided with a backplate 121 disposed through a backplate opening 119 located near the second end 113 of the brush housing 111. The backplate 121 serves to substantially cover the brush chambers 114a and 114b near the second end 113 of the brush housing 111 and to maintain the rigid conductors 115a and 115b on the brush housing 111. The backplate 121 can be secured to the brush housing 111 via snaps (not shown) or any other means capable of maintaining the backplate 121 on the brush housing 111.

The brush assembly 106 is further provided with a pair of brush springs 120. Only one of the brush springs 120 is depicted in FIG. 4A for purposes of clarity. The brush spring 120 is shown in more detail in FIG. 5. The brush spring 120 has an intrinsic spring force, a first end 122, a second end 124 and an opening 125 extending therebetween.

Referring to FIGS. 4A and 4C in combination with FIG. 5, one of the brush springs 120 is disposed between the first terminal end 116b and the brush 110, and another one of the brush springs 120 is disposed between the first terminal end 116a and the brush 108. The flexible conductors 118a and 118b connecting the first terminal ends 116a and 116b to the brushes 108 and 110, respectively, extend through the openings 125 formed through the brush springs 120.

As shown in FIG. 5, the brush spring 120 can be characterized as having a first end portion 126, a second end portion 128, and a medial portion 130. The first end portion 126 extends a predetermined distance from the first end 122 towards the second end 124. The medial portion 130 extends a predetermined distance from the first end portion 126 towards the second end 124. The second end portion 128 extends a predetermined distance from the medial portion 130 to the second end 124. The medial portion 130 of the brush spring 120 has a substantially uniform diameter 132. The first end portion 126 of the brush spring 120 tapers radially inwardly towards the first end 122 of the brush spring 120, and the second end portion 128 of the brush spring 120 tapers radially inwardly towards the second end 124 thereof such that the first end 122 and the second end 124 have a diameter 134 which is less than the diameter 132 of the medial portion 130. Each of the brush springs 120 is disposed in one of the brush chambers 114a and 114b (FIG. 4A) of the brush housing 111 such that the first end 122 of the brush spring 120 is disposed in close proximity to the first end 112 of the brush housing 111.

To assemble the brush assembly 106, one end of the flexible conductor 118b is connected to the brush 110 (FIG. 4C). The other end of the flexible conductor 118b is then disposed through the opening 125 in the brush spring 120 such that at least a portion of the flexible conductor 118b protrudes from the end of the brush spring 120 opposite the brush 110. The protruding end of the flexible conductor 118b is then connected to the first terminal end 116b of the rigid conductor 115b via soldering or welding, for example. The brush 110 and the brush spring 120 are then inserted into the brush chamber 114b through the second end 113 of the brush housing 111 until an upper end 136b of the first terminal end 116b is disposed in a recess 138b provided in the brush housing 111. The above described procedure is then repeated to connect the brush 108 to the first terminal end 116a of the rigid conductor 115a to permit electrical communication therebetween. Once the brushes 108 and 110 and brush springs 120 are assembled and disposed in respective brush chambers 114a and 114b, the backplate 121 is slid through the backplate opening 119 provided near the second end 113 of the brush housing 111 to maintain the rigid conductors 115a and 115b in place.

Once each of the brush springs 120 is disposed in one of the brush chambers 114a and 114b, each of the first and second brushes 108, 110 can reciprocate in respective brush chambers 114a and 114b of the brush housing 111 against the spring force of the brush spring 120 such that the first end 122 of one of the brush springs 120 engages the first brush 108, for example, and urges at least a portion of the first brush 108 beyond the first end 112 of the brush housing 111, as depicted in FIG. 4A.

It should be noted that the tapering of the brush spring 120 throughout the first end portion 126 thereof prevents the first and second brushes 108 and 110 from being inadvertently locked between one of the loops of the brush spring 120 and the brush housing 111. The first and second brushes 108 and 110 can be the brushes which are utilized in an existing CS-130 alternator, such as the alternator 10. In addition, the rigid conductors 115a and 115b extending exteriorly of the brush housing 111 are an improvement over the prior art brush housings (not shown) having the exteriorly extending flexible conductors in that the rigid conductors 115a and 115b are much more resistant to the problems of pinching and cutting of the flexible conductors, as hereinbefore described. Thus, the replacement alternator 70 having the brush housing 111 and the brush spring 120 is more reliable than the prior art alternator 10.

Referring now to FIG. 2A, the drive end housing 72 is provided with a bearing well 140 adapted to receive a drive end bearing 142, an opening 144 adapted to receive the drive shaft 80 of the rotor assembly 78 near the drive end 82 thereof, and a plurality of air vents 146 adapted to permit air to flow out of the alternator interior space 76 of the alternator 70. Only one of the air vents 146 is labeled in FIG. 2A for purposes of clarity.

A bearing spacer 148 is disposed on the drive shaft 80 of the rotor assembly 78 to space the first hub 86 from the drive end bearing 142. The drive end bearing 142 can be a 6-203-2 bearing, the bearing spacer 148 can be a 46-1602 spacer, and the drive end housing 72 can be a 21-117 housing which are obtainable from General Motors.

The drive end bearing 142 has an opening 150 formed therethrough. The opening 150 is sized to matingly receive the drive shaft 80 of the rotor assembly 78 near the drive end 82 thereof. In an assembled condition of the alternator 70, the drive end bearing 142 is disposed in the bearing well 140 of the drive end housing 72 and the drive shaft 80 extends through the openings 144 and 150 provided in the drive end housing 72 and the drive end bearing 142, respectively, so that the drive end housing 72 rotatably supports the rotor assembly 78.

A drive pulley 152 and a fan 154 are disposed on a portion of the drive shaft 80 of the rotor assembly 78 which is disposed externally of the drive end housing 72 in an assembled condition of the alternator 70. The drive pulley 152 and the fan 154 are secured on the drive shaft 80 via a nut 156 and a lock washer 158. The drive pulley 152 can be a 24-1250 pulley and the fan 154 can be a 25-108 fan which are obtainable from General Motors.

The drive pulley 152 is spaced a distance from the fan 154 by a pulley spacer 160 disposed coaxially on the drive shaft 80 of the rotor assembly 78 and the fan 154 is spaced a distance from the drive end housing 72 by a fan spacer 162 disposed coaxially on the drive shaft 80 of the rotor assembly 78. The drive pulley 152 is shaped to receive a drive belt (not shown) which couples the drive pulley 152 to the drive shaft of an engine (not shown) in a manner well known in the art so that the rotor assembly 78 can be selectively rotated at a speed of at least 1600 RPMs. The pulley spacer 160 can be a 46-1601 spacer and the fan spacer 162 can be a 46-1616 spacer which are obtainable from General Motors.

The alternator 70 is further provided with a stator assembly 170 which is constructed in accordance with the present invention. The stator assembly 170 of the present invention cooperates with the rotor assembly 78 to increase the electrical current output of the alternator 70 by about 26 percent at about 1600 RPMs as compared to the prior art alternator 10. The stator assembly 170 is positioned in the rotating magnetic field generated by the wire 100 of the rotor assembly 78 and is clamped between the drive end housing 72 and the slip ring end housing 74 (FIG. 2B) such that the stator assembly 170 is supported by the housing of the alternator 70 when the alternator 70 is in an assembled condition.

The stator assembly 170 is shown in more detail in FIGS. 6–9. Referring now to FIG. 2A in combination with FIGS. 6–9, the stator assembly 170 is provided with a stator lamination 172 (FIGS. 2A, 6, 7, 8, and 9) and a plurality of stator windings 174 (FIGS. 2A, 8, and 9) wound about the stator lamination 172.

The stator lamination 172 is formed from a plurality of layers (FIG. 8) of a laminated magnetically permeable material (as depicted by the spaced apart vertical lines on the stator lamination 172) which have been bonded together in a conventional manner. The stator lamination 172 has an outer peripheral surface 176 (FIG. 6), a first side 178 (FIG. 8), a second side 180 (FIG. 8), an opening 182 (FIG. 6) extending between the first side 178 and the second side 180 of the stator lamination 172 and a plurality of equally spaced-apart poles 184 (FIG. 6) disposed circumferentially about the opening 182 of the stator lamination 172. Only three of the poles are labeled in FIG. 6 by the general reference numerals 184a, 184b, and 184c for purposes of clarity.

Each adjacently disposed pair of poles 184 defines a slot 186 (FIGS. 6, 7, and 9) therebetween which is adapted to receive the stator windings 174 therein (FIGS. 8 and 9). Only two of the slots 186 are labeled in FIGS. 6 and 7 by the general reference numerals 186a and 186b for purposes of clarity. Each slot 186 has an inwardly disposed end 188, an outwardly disposed end 190 and a length 192 extending generally between the inwardly disposed end 188 and the outwardly disposed end 190 thereof. The length 192 of each of the slots 186 is about 19.23 millimeters to about 19.43 millimeters. Desirably, the stator lamination 172 is provided with 36 poles 184 to provide the stator lamination 172 with 36 equally spaced slots 186.

A plurality of uniformly spaced-apart notches 200 (FIGS. 6 and 7) are formed in the outer peripheral surface 176 of the stator lamination 172. Only two of the notches 200 are labeled in FIG. 6 by the general reference numerals 200a and 200b for purposes of clarity. Each of the notches 200 extends generally between the first side 178 and the second side 180 of the stator lamination 172. The notches 200 serve to allow clearance for through bolts. Each pair of adjacently disposed notches 200 are spaced about 60 degrees apart.

It should be noted that a reference notch 202 (FIG. 6) is provided in the outer peripheral surface 176 of the stator lamination 172. The reference notch 202 extends generally between the first side 178 and the second side 180 of the stator lamination 172. The reference notch 202 is disposed about 10 degrees from one of the notches 200.

A plurality of equally spaced-apart holes 204 (FIG. 6) are formed in the stator lamination 172. Only two of the holes 204 are labeled in FIG. 6 by the general reference numerals 204a and 204b for purposes of clarity. The holes 204 extend generally between the first side 178 and the second side 180 of the stator lamination 172. Each pair of equally spaced holes 204 are spaced about 60 degrees apart. It should be noted that one of the holes 204 is disposed at a mid-point between each pair of adjacently disposed notches 200. The holes 204 serve to join the stator lamination 172 with rivets (not shown).

The opening 182 of the stator lamination 172 is sized to receive the first and second hubs 86 and 88 of the rotor assembly 78 such that the rotor assembly 78 can freely rotate therein. The stator lamination 172 has an inside diameter 206 (FIG. 6) extending across the opening 182 therein, an outside diameter 208 (FIG. 6) and a thickness 210 (FIG. 7) extending between the outwardly disposed end 190 of the slots 186 and the outer peripheral surface 176 of the stator lamination 172. The inside diameter 206 of the stator lamination 172 is about 96.57 millimeters to about 96.67 millimeters. The outside diameter 208 of the stator lamination 172 can vary between about 129.75 millimeters to about 132.50 millimeters. The thickness 210 of the stator lamination 172 can be about 4.94 millimeters to about 5.04 millimeters.

It should be noted that the construction of the stator lamination 172 is substantially identical to the construction of the stator lamination 56 of the prior art alternator 10 shown in FIG. 1. However, it should be noted that the length 192 of the slots 186 of the stator lamination 172 can be increased as compared to the slots (not shown) in the stator lamination 56 of the prior art alternator. In this embodiment, the inside diameter 206 of the stator lamination 172 is substantially identical to the inside diameter (not shown) of the stator lamination 56 of the prior art alternator 10 and the thickness 210 of the stator lamination 172 is substantially identical to the thickness (not shown) of the stator lamination 56 of the prior art alternator 10. However, the outside diameter 208 of the stator lamination 172 of the present invention is about 2 millimeters greater than the outside diameter (not shown) of the stator lamination 56 of the prior art alternator 10 so that the length 192 of the slots 186 formed in the stator lamination 172 is about 1 millimeter longer than the length (not shown) of the slots formed in the stator lamination 56 of the prior art alternator 10. The increased outside diameter 208 (about 132.00 millimeters) of the stator lamination 172 increases the volume of the stator lamination 172 and the increased length of the slots 186 increases the number of turns or windings of wire which can be made on the stator lamination 172. An additional turn or winding of wire per each slot 186 formed in the stator lamination 172 has contributed to the increased electrical current output by the stator assembly 170 of the present invention while also permitting the alternator 70 to be disposed in the predetermined alternator space within the vehicle where the prior art CS-130 alternator 10 was disposed. It should be noted that in one embodiment of the present invention at least 12 turns of about 14 gauge wire is provided in each of the slots 186 formed in the stator lamination 172 having substantially the same dimensions as the stator lamination 56.

As shown in more detail in FIG. 7, each of the poles 184 has a first side 220, a second side 224, a first end 226 and a second end 228. The first end 226 of each pole 184 is disposed substantially adjacent the opening 182 formed in the stator lamination 172.

The first end 226 of each pole 184 is provided with a first lip 230 and a second lip 232. The first lip 230 extends a distance past the first side 220 of the pole 184 and the second lip 232 extends a distance past the second side 224 of the pole 184. It should be noted that the first lip 230 of one pole 184 is spaced a distance 234 of about 3.48 millimeters to about 3.58 millimeters from the second lip 232 of an adjacently disposed pole 184 to form a wire receiving passageway 236 therebetween.

As depicted in FIG. 8, the stator windings 174 of the stator assembly 170 are wound through the slots 186 formed in the stator lamination 172, typically in a delta connected, three phase configuration. The stator windings 174 are looped between the slots 186 formed in the stator lamination 172 to form a plurality of first wire loop portions 240 extending a distance outwardly beyond the first side 178 of the stator lamination 172 and a plurality of second wire loop portions 242 extending outwardly beyond the second side 180 of the stator lamination 172. Only two of the first wire loop portions are labeled in FIG. 8 as 240a and 240b for purposes of clarity and only two of the second wire loop portions are labeled in FIG. 8 as 242a and 242b for purposes of clarity. The stator assembly 170 has a width 244 extending between an outermost portion of the first wire loop portions 240 and an outermost portion of the second wire loop portions 242 and the stator lamination 172 has a width 246 extending between the first side 178 and the second side 180 thereof.

The width 246 of the stator lamination 172 of the present invention is substantially identical to the width (not shown) of the stator lamination 56 of the prior art alternator 10. However, it should be noted that it is desirable that the width 244 of the stator assembly 170 be as small as possible to reduce electrical resistance losses and to reduce magnetic flux leakage. The width 244 of the stator assembly 170 of the present invention is desirably less than about 58.00 mm and more desirably less than about 55.50 mm, which is less than the width (not shown) of the stator assembly 52 of the prior art alternator 10. The decreased width of the stator assembly 170 contributes to the increased electrical current output of the alternator 70 of the present invention.

The stator windings 174 can be maintained within the slots 186 in the stator lamination 172 by any manner known in the art. For example, a wedge 248 (FIG. 9) can be inserted into each of the slots 186 formed in the stator lamination 172 after the stator windings 174 are disposed therein. The wedge 248 engages the first and second lips 230 and 232 of the poles 184 to maintain the stator windings 174 within the slots 186.

Systems and services for winding the stator windings 174 onto the stator lamination 172 are available from Windamatic Systems of Hunterstown, Ind. or Advanced Machine and Tool of Fort Wayne, Ind.

Referring now to FIG. 2A, in operation, the wire 100 of the rotor assembly 78 is supplied with electricity via the first and second slip rings 102 and 104 and the wire 100 is rotated by the engine of the vehicle via the drive pulley 152 so that the magnetic field generated by DC current through the wire 100 rotates. The rotating magnetic field induces an electrical current in the stator windings 174 of the stator assembly 170. The electrical current induced in the stator windings 174 is supplied to a rectifier 252 (FIG. 2B) via three output leads 254 which are either connected to or formed integrally with the stator windings 174 and which are electrically connected to the rectifier 252. The output leads are designated in FIG. 2A by the reference numerals 254a, 254b, and 254c.

The rectifier 252 is mounted to the slip ring end housing 74 by a pair of mounting bolts 255 and is disposed in the alternator interior space 76. It should be noted that one of the bolts 255 has an insulator 256 disposed coaxially thereon for insulating the slip ring end housing 74 from the rectifier 252. The rectifier 252 has an opening 258 formed therethrough for a purpose to be described below. The rectifier 252 can be a 31-113 rectifier obtainable from General Motors.

The alternator 70 is provided with a voltage regulator 260 which is disposed in the alternator interior space 76. The voltage regulator 260 has a positive power terminal 262 and a ground terminal forming an input, a field terminal 394 and a ground terminal 264 forming an output, a first opening 266 formed through the positive power terminal 262, and a second opening 268 formed through the ground terminal 264. The input of the voltage regulator 260 receives electricity from an electrical system of the vehicle via a battery terminal assembly 270 (FIG. 11) which is constructed in accordance with the present invention.

The output of the voltage regulator 260 is electrically connected to the brush assembly 106 adjacent the second opening 268 via a mounting bolt 272 disposed through the second opening 268. It should be noted that the mounting bolt 272 also serves to mount the brush assembly 106 and the voltage regulator 260 to the slip ring end housing 74. The voltage regulator 260 will be described in more detail hereinafter with reference to FIG. 18.

The battery terminal assembly 270 is shown in more detail in FIGS. 10–15. Referring now to FIGS. 2A and 2B in combination with FIGS. 10–15, the battery terminal assembly 270 is provided with an elongated shaft 274 (FIG. 10) having a first end 276 and a second end 278. The elongated shaft 274 can be characterized as having a first end portion 280, a medial portion 282 and a second end portion 284. The first end portion 280 extends from the first end 276 of the elongated shaft 274 a predetermined distance towards the second end 278 of the elongated shaft 274. The medial portion 282 extends a predetermined distance from the first end portion 280 towards the second end 278 of the elongated shaft 274. The second end portion 284 extends a predetermined distance from the medial portion 282 to the second end 278 of the elongated shaft 274.

The medial portion 282 of the elongated shaft 274 is configured to be matingly disposed in the opening 258 formed in the rectifier 252 to provide a press-fit connection between the elongated shaft 274 and the rectifier 252. The medial portion 282 of the elongated shaft 274 is knurled to provide additional strength to the press-fit connection between the elongated shaft 274 and the positive heat sink of the rectifier 252.

The first end portion 280 of the elongated shaft 274 is configured to be disposed in an opening 286 (FIGS. 11 and 16) in the slip ring end housing 74 such that an externally threaded portion 288 (FIGS. 10 and 11) of the first end portion 280 of the elongated shaft 274 extends outwardly from the slip ring end housing 74.

To insulate the elongated shaft 274 from the slip ring end housing 74, an insulator 290 (FIGS. 2B, 11, 12, and 13) is disposed on the first end portion 280 of the elongated shaft 274 such that the insulator 290 is positioned adjacent the exterior of the slip ring end housing 74. A first nut 292 (FIGS. 2B, 11, 14, and 15) is provided on the outwardly extending threaded portion 288 of the first end portion 280 of the elongated shaft 274 for exerting a first clamping force between the insulator 290 and the rectifier 252 to clamp the rectifier 252 to the slip ring end housing 74 such that the elongated shaft 274, insulator 290, and rectifier 252 are maintained in a stable position relative to the slip ring end housing 74.

Once the rectifier 252 and elongated shaft 274 are secured to the slip ring end housing 74, a terminal 294 of the battery cable 296 of the vehicle is disposed on a portion of the elongated shaft 274 which is disposed externally of the first nut 292. The terminal 294 is then secured in a stable position on the elongated shaft 274 via a second nut 298.

The second end portion 284 of the elongated shaft 274 is configured to be disposed through the first opening 266 formed in the positive power terminal 262 of the voltage regulator 260. The second end portion 284 of the elongated shaft 274 is externally threaded to receive a third nut 300 for exerting a second clamping force between the voltage regulator 260 and the rectifier 252 to clamp or maintain the voltage regulator 260 and the rectifier 252 in a stable or secure position.

Because the medial portion 282 of the elongated shaft 274 is connected to the rectifier 252, the medial portion 282 serves to isolate the first clamping force from the second clamping force such that if one of the first and second clamping forces becomes loose, the other one of the first and second clamping forces is not affected.

The insulator 290 is shown in more detail in FIGS. 12 and 13. The insulator 290 has a radially extending outer or first portion 302, an axially extending inner or second portion 304 and an opening 306 extending through the first and second portions 302 and 304 of the insulator 290. The radially extending first portion 302 is configured to insulate the first nut 292 from the slip ring end housing 74. The axially extending inner or second portion 304 of the insulator 290 is configured to be disposed in the opening 286 of the slip ring end housing 74 to insulate the elongated shaft 274 from the slip ring end housing 74.

The radially extending outer or first portion 302 of the insulator 290 has a substantially circular configuration and the axially extending inner or second portion 304 has a substantially square-shaped configuration.

The insulator 290 is constructed of an electrically insulating heat-resistant material which can desirably withstand temperatures of at least about 480° Fahrenheit and more desirably of at least about 500° Fahrenheit. For example, the insulator 290 can be constructed out of a plastic which is sold under the trademark "SUPEC" and which is obtainable from General Electric.

Figure 14:
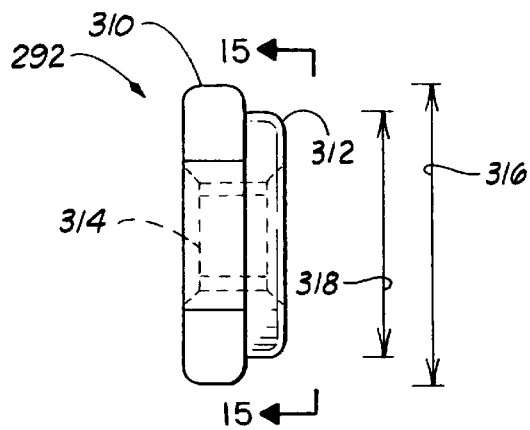
FIG. 14 is a side view of a first nut which is constructed in accordance with the present invention.
Figure 15:
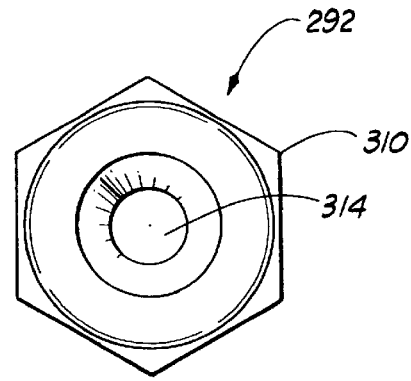
FIG. 15 is an end view of the first nut of FIG. 14, taken along the lines 15—15 of FIG. 14.

The first nut 292 which is disposed adjacent the insulator 290 is shown in more detail in FIGS. 14 and 15. The first nut 292 has a first portion 310, a second portion 312, and a threaded bore 314 formed therethrough. The first portion 310 of the first nut 292 has a diameter 316 which is greater than a diameter 318 of the second portion 312 of the first nut 292. The threaded bore 314 is adapted to matingly engage the threads of the threaded portion 288 of the elongated shaft 274 such that the second portion 312 is disposed adjacent the radially extending outer portion 302 of the insulator 290 to secure the insulator 290 in a stable position adjacent the slip ring end housing 74 of the alternator 70.

It should be noted that the specific configuration of the first nut 292 contributes to the enhanced reliability of the replacement alternator 70 in that the second portion 312 of the first nut 292 cooperates with the first portion 310 of the first nut 292 to provide a heat sink such that upon connection of the terminal 294 of the battery cable 296 to the elongated shaft 274, the first nut 292 prevents heat generated from a loose terminal 294 from being transferred through the elongated shaft 274 into the alternator interior space 76 of the alternator 70. The first nut 292 can be fabricated of low-carbon steel and has a diameter of at least about 14.30 millimeters extending across the first portion 310 and a diameter (not shown) of at least about 13.97 millimeters extending across the second portion 312.

Figure 16:
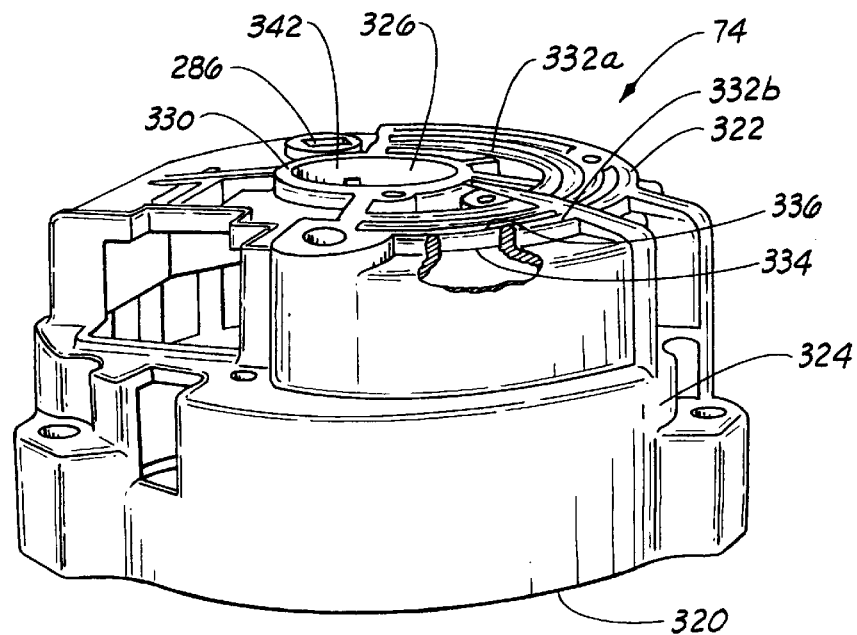
FIG. 16 is a partial cutaway perspective view of a slip ring end housing which is constructed in accordance with the present invention.

Referring now to FIG. 2B in combination with FIG. 16, the slip ring end housing 74 of the alternator 70 of the present invention will now be described in detail. As described below, the slip ring end housing 74 of the present invention has been provided with additional heat sinks as compared to the slip ring end housing 18 of the prior art alternator 10 to lower the temperature of the rectifier 252 of the alternator 70 by about 15° Fahrenheit to about 20° Fahrenheit as compared to the rectifier of the prior art alternator 10. This lower temperature enhances the reliability of the alternator 70.

The slip ring end housing 74 has an open first end 320, a second end 322, and a sidewall 324 extending therebetween. The second end 322 of the slip ring end housing 74 includes a bearing well 326 having an inner side 328 (FIG. 2B) and an outer side 330 (FIG. 16), and a plurality of spaced apart semi-circularly shaped heat sink fins 332 disposed around the bearing well 326. Only two of the heat sink fins are labeled in FIG. 16 as 332*a* and 332*b*. Each of the heat sink fins 332 has an inwardly disposed end 334 and an outwardly disposed end 336.

It should be noted that the construction of the slip ring end housing 74 is substantially identical to the construction of the slip ring end housing 18 of the prior art alternator 10, with the exception that the outwardly disposed end 336 of the heat sink fins 332 have been extended outwardly as compared to the heat sink fins of the slip ring end housing 18 of the prior art alternator 10 such that the outwardly disposed end 336 of the heat sink fins 332 of the present invention are disposed about level with the outer side 330 of the bearing well 326 for increasing the surface area of the heat sink fins 332 without significantly increasing the length of the alternator 70.

The slip ring end housing 74 of the alternator 70 of the present invention was tested by operating substantially identical alternators with the slip ring end housing 74 of the present invention and the slip ring end housing 18 provided as original equipment on the prior art alternator 10. The alternators were operated under substantially similar ambient temperatures for about 20 minutes at a constant output of about 90 amperes of current. Two temperature readings were taken on randomly picked but identical locations on the heat sink fins 332 of the slip ring end housing 74 of the alternator 70 and the heat sink fins of the slip ring end housing 18 of the prior art alternator 10. The first temperature reading obtained on the slip ring end housing 74 of the present invention was determined to be about 199° Fahrenheit while the first temperature reading obtained from the same location of the slip ring end housing 18 of the prior art alternator 10 was determined to be about 217° Fahrenheit. The second temperature reading obtained on the slip ring end housing 74 of the present invention was determined to be about 207° Fahrenheit while the second temperature reading obtained from the same location of the slip ring end housing 18 of the prior art alternator 10 was determined to be about 221° Fahrenheit. This substantial reduction in temperature is caused by the increased surface area of the heat sink fins 332. The decreased temperature of the heat sink fins 332 contributes to the enhanced reliability of the replacement alternator 70.

The bearing well 326 of the slip ring end housing 74 of the present invention is sized to receive a bearing tolerance ring 340. An opening 342 is formed in the bearing well 326 to receive the slip ring end 84 (FIG. 2A) of the drive shaft 80 of the rotor assembly 78, and a plurality of air vents 344 are formed through the slip ring end housing 74 to permit air to flow into the alternator interior space 76. The bearing tolerance ring 340 has an opening 346 formed therethrough for receiving a slip ring end bearing 348 (FIG. 2A). The bearing tolerance ring 340 can be a 46-1562 bearing tolerance ring and the slip ring end bearing 348 can be a 6100-2 bearing which are obtainable from General Motors.

A dust cover 350 (FIG. 2B) is disposed over the air vents 344 of the slip ring end housing 74 to prevent dust from entering the alternator interior space 76 from the air vents 344. The dust cover 350 is connected to the slip ring end housing 74 via a pair of outwardly extending pins 353 on the dust cover 350 which snap into a pair of corresponding bores (not shown) provided on the slip ring end housing 74. The dust cover 350 can be a 46-1401 dust cover obtainable from General Motors.

The bearing tolerance ring 340 is disposed in the bearing well 326 of the slip ring end housing 74 and the slip ring end bearing 348 is disposed within the opening 346 formed in the bearing tolerance ring 340. The slip ring end bearing 348 has an opening 352 formed therethrough for receiving the slip ring end 84 of the drive shaft 80 of the rotor assembly 78. The slip ring end 84 of the drive shaft 80 of the rotor assembly 78 is disposed in the openings 352 and 342 which are formed in the slip ring end bearing 348 and the slip ring end housing 74 such that the slip ring end housing 74 rotatably supports the slip ring end 84 of the drive shaft 80 of the rotor assembly 78.

The alternator 70 is provided with a baffle 354 which is disposed between the stator assembly 170 and the brush assembly 106 in the alternator interior space 76. The baffle 354 is provided with an opening 356 formed therethrough. The opening 356 is sized to receive the rotor fan 98 so that the rotor fan 98 can freely rotate therein. The baffle 354 can be a 46-1856 baffle obtainable from General Motors.

The slip ring end housing 74 is connected to the drive end housing 72 so as to sandwich the stator assembly 170 therebetween via a plurality of mounting bolts 358. Only one mounting bolt 358 is shown in FIG. 2B for purposes of clarity.

Figure 17:
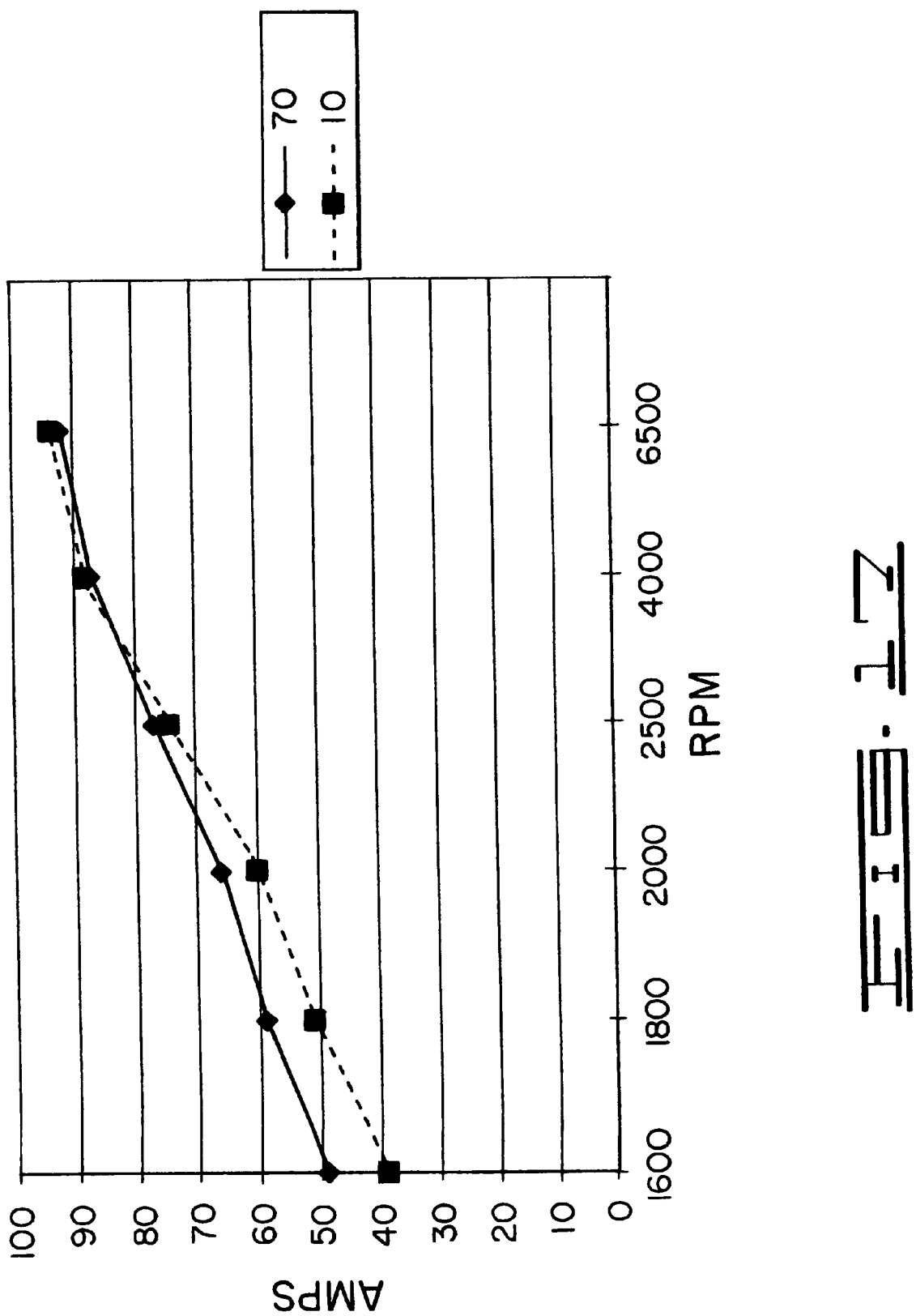
FIG. 17 is a chart comparing the electrical current output by the prior art alternator of FIG. 1 with the electrical current output by the replacement alternator of FIGS. 2A and 2B at different speeds of such alternators.

The power output of the replacement alternator 70 of the present invention and the prior art alternator 10 were tested and the results of such tests are depicted in the graph set forth as FIG. 17. The test data obtained on the prior art alternator 10 are represented in FIG. 17 by the dashed lines and the test data obtained on the replacement alternator 70 are represented in FIG. 17 by the solid lines.

Initially, the replacement alternator 70 and the prior art alternator 10 were operated at a speed of about 5000 RPMs at a substantially uniform output voltage of about 13 volts for a period of time sufficient to stabilize the output current of such alternators (about 10 minutes). The replacement alternator 70 and the prior art alternator 10 were then selectively operated at speeds of: 1600 RPMS; 1800 RPMs; 2000 RPMs; 2500 RPMs; 4000 RPMs; and 6500 RPMs. The output currents of the alternators 10 and 70 were obtained at each of the speeds while the output voltages of such alternators were maintained at 13 volts.

As depicted in FIG. 17, at a speed of about 1600 RPMs the output current of the replacement alternator 70 was 49 amperes whereas the output current of the prior art alternator 10 was 39 amperes. Thus, the current output of the replacement alternator 70 is about 26% greater than the current output of the prior art alternator 10 when such alternators are operated at a speed of about 1600 RPMs, which shows a substantial unexpected improvement over the prior art alternator 10. The replacement alternator 70 provides a stabilized current output of at least about 43 amperes in the stator windings 174 at about 1600 revolutions per minute of the rotor coil form 96. The determination of the current induced in the stator windings 174 can vary depending on the particular test stand utilized. Thus, it should be understood that the term "about 43 amperes" refers to a current output range varying between about 41 amperes to about 45 amperes.

Figure 18:
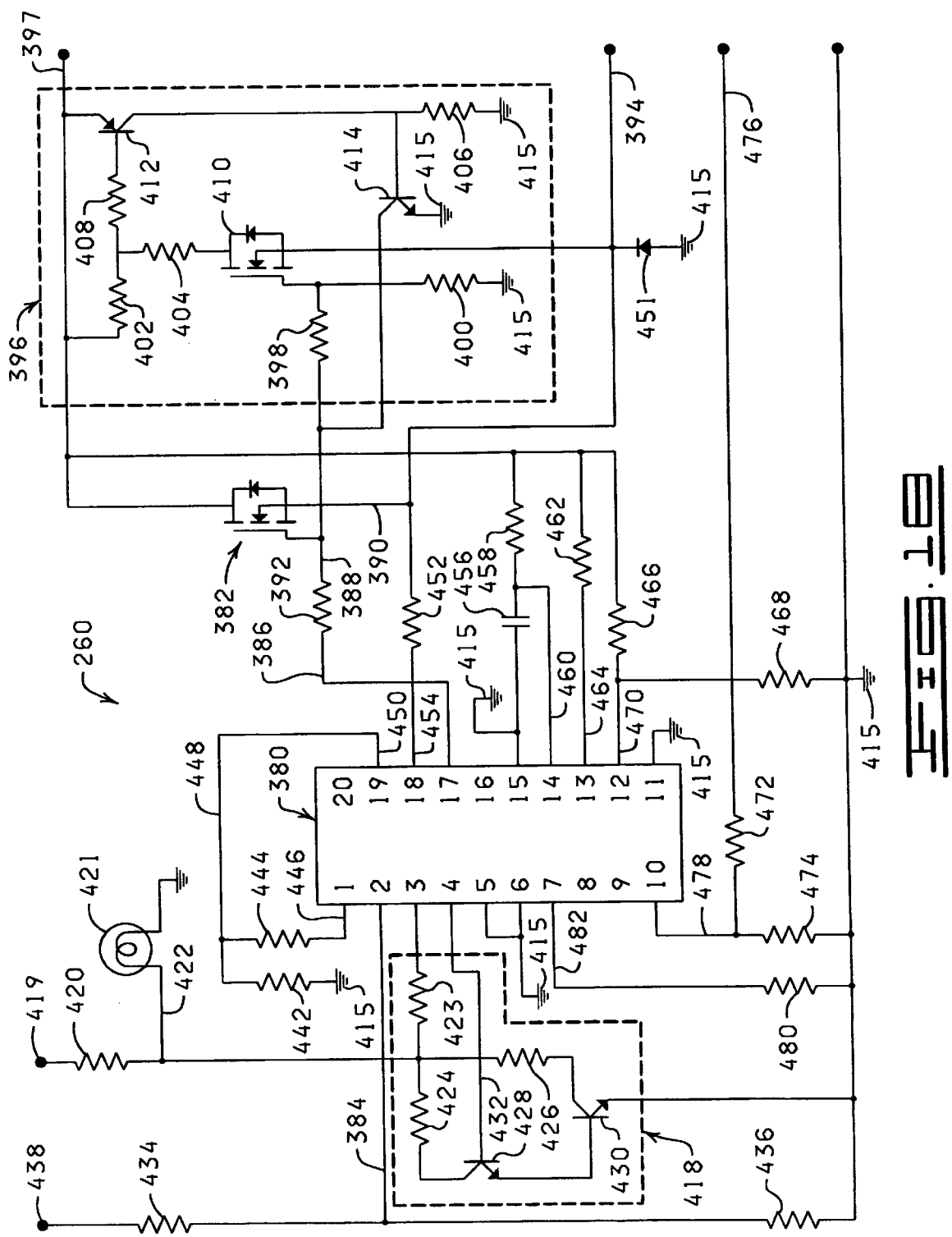
FIG. 18 is a schematic diagram of one embodiment of a voltage regulator circuit constructed in accordance with the present invention for use in a voltage regulator depicted in FIG. 2B.

Shown in FIG. 18 is the circuitry for one embodiment of the voltage regulator 260 utilized by the replacement alternator 70 of the present invention. The voltage regulator 260 of the replacement alternator 70 is provided with a logic control unit 380 and an electronic switch 382. The logic control unit 380 has a local sense input 384 and an output 386. The electronic switch 382 has an input 388 and an output 390. The output 386 of the logic control unit 380 is electrically connected to the input 388 of the electronic switch 382 via a resistor 392. The voltage regulator 260 which receives signals indicative of the alternator output voltage via the local sense input 384. In response thereto, the output 386 of the logic control unit 380 outputs signals indicative of predefined voltage regulation requirements to be received by the electronic switch 382. The output 390 of the electronic switch 382 is electrically connected to the wire 100 wound on the rotor coil form 96 via the field terminal 394. When the logic control unit 380 outputs signals to the electronic switch 382 indicative that the automobile requires more power, the electronic switch 382 increases the flow of current to the wire 100 wound on the rotor coil form 96 via signal path 394 thereby increasing the intensity of the magnetic field and increasing the voltage which the replacement alternator 70 outputs. When the logic control unit 380 outputs signals to the electronic switch 382 indicative that the automobile requires less power, the electronic switch 382 decreases the flow of current to the wire 100 wound on the rotor coil form 96, thereby decreasing the intensity of the magnetic field and decreasing the voltage which the replacement alternator 70 outputs. The logic control unit 380 is typically an integrated circuit, such as an MC33092DW, obtainable from Motorola, Inc. However, it should be understood that the logic control unit 380 can be any circuit capable of functioning as a logic control unit, such as a suitably programmed microprocessor.

The electronic switch 382 of the voltage regulator 260 can be any electronic switch capable of controlling the current supplied to the wire 100 wound on the rotor coil form 96 such as a transistor, a JFET, a MOSFET, a relay or the like. However, the electronic switch 382 is typically a MOSFET having a low saturation voltage and a low on resistance so that the internal heat created by the electronic switch 382 is minimized. The saturation voltage of the electronic switch 382 is less than about 0.7 volts at 5 amperes and is desirably less than about 0.3 volts at 5 amperes. The on resistance of the electronic switch 382 is typically 0.045 ohms. The electronic switch 382 can be an MTD20N06HD, obtainable from Motorola, Inc.

The voltage regulator 260 is further provided with a shorted field protection circuit 396 connected in parallel with the electronic switch 382. The shorted field protection circuit 396 functions to turn off the electronic switch 382 in the event of a fault in the wire 100 wound on the rotor coil form 96 to prevent the electronic switch 382 from being damaged thereby. The shorted field protection circuit 396 is connected to the positive power terminal 262 and is provided with a resistor 398, a resistor 400, a resistor 402, a resistor 404, a resistor 406, a resistor 408, an electronic switch 410, an electronic switch 412, and an electronic switch 414 connected substantially as shown in the drawings. It should be noted that the shorted field protection circuit 396 is connected between the positive power terminal 262 and the ground terminal 264 substantially as shown in FIG. 18.

When the wire 100 wound on the rotor coil form 96 is in a non-shorted condition such that the replacement alternator 70 is operating normally, the electronic switch 382 is in an on condition, the electronic switch 410 is in an on condition, the electronic switch 412 is in an off condition, and the electronic switch 414 is in an off condition. However, if a fault such as a short circuit occurs in the wire 100 wound on the rotor coil form 96, the current in the wire 100 increases. As the current in the wire 100 increases, the current passing through the electronic switch 382 increases causing the voltage across the electronic switch 410 to increase correspondingly. As the voltage across the electronic switch 410 increases, the voltage across the resistor 402 also increases. When the voltage across the resistor 402 exceeds a predetermined threshold, the increased voltage causes the electronic switch 412 to be switched to an on condition whereby current flows through the electronic switch 412. The current flowing through the electronic switch 412 causes the voltage to increase above a predetermined threshold on the base of the electronic switch 414 to switch the electronic switch 414 to an on condition. When the electronic switch 414 is switched to the on condition, the voltage on the output 386 of the logic control unit 380 is almost grounded. In the meantime, the voltage on the input 388 of the electronic switch 382 is decreased below a predetermined threshold so as to switch the electronic switch 382 off. Thus, the shorted field protection circuit 396 functions to sense the increase in current passing through the wire 100 and when the current passing through the wire 100 exceeds a predetermined threshold of typically about 14 amperes, the shorted field protection circuit 396 switches the electronic switch 382 to an off or non-conducting condition so that the electronic switch 382 is not damaged by the occurrence of the fault in the wire 100.

Once the fault or shorted condition is removed in the wire 100, the voltage across the resistor 402 is decreased. This decreased voltage causes the electronic switch 412 to be switched to an off condition whereby current does not flow therethrough. This causes the voltage on the base of the electronic switch 414 to be decreased below a predetermined threshold so as to switch the electronic switch 414 to an off or non-conducting condition. When the electronic switch 414 is switched to the off or non-conducting condition, this causes the voltage on the output 386 of the logic control unit 380 to return to a normal condition, and the voltage on the input 388 of the electronic switch 382 to increase above a predetermined threshold to switch the electronic switch 382 to the on or conducting condition. Thus, the shorted field protection circuit 396 senses when the fault or short circuit is removed in the wire 100 and switches the electronic switch 382 back to the on or conducting condition to re-establish current in the wire 100.

It should be understood by those of ordinary skill in the art that the electronic switch 382 and the shorted field protection circuit 396 are disposed exteriorly of the logic control unit 380 between the positive power terminal 262 (the positive power terminal 262 is commonly referred to in the art as "B+") and the ground terminal 264. The electronic switch 382 being disposed between the positive power terminal 262 and the wire 100 being connected to the ground terminal 264 (as shown in FIG. 18) is commonly referred to in the art as a "high side drive". The shorted field protection circuit 396 is adapted to work with alternators having a "high side drive".

The voltage regulator 260 is further provided with a shorted lamp protection circuit 418 disposed externally of the logic control unit 380, substantially as shown in FIG. 18 for protecting the voltage regulator 260 so that the voltage regulator 260 can operate continuously under a shorted lamp condition. The shorted lamp protection circuit 418 is connected to an ignition terminal 419 (provided as a plug connection on the voltage regulator 260 in a manner well known in the art) via a current limiting means such as a resistor 420. The ignition terminal 419 is connected to an ignition switch 431 provided in the dash of the automobile via a signal path 419a. The shorted lamp protection circuit 418 is also connected to a lamp terminal 421 which is connected to an indicator lamp 422 provided in the dash of the automobile via the signal path 422a. The shorted lamp protection circuit 418 is provided with a resistor 423, a resistor 424, a resistor 426, an electronic switch 428, and an electronic switch 430. The lamp terminal 421 inputs a substantially continuous signal of about 14 v to the electronic switch 428 via the resistor 424 when the ignition switch 431 is in a closed condition. To turn the lamp 422 on to indicate a fault in the charging system of the automobile, such as when the alternator 70 has failed, or when the ignition switch 431 on the automobile is in a "key on-engine off" position, the logic control unit 380 outputs signals over the signal path 432 so as to turn the electronic switch 428 to an on or conducting condition to permit current to flow between the resistor 424 and the electronic switch 430 to bias the base of the electronic switch 430 above a predetermined threshold to switch the electronic switch 430 to an on or conducting condition. When the electronic switch 430 is switched to the on or conducting condition, current flows through the lamp 422, the resistor 426, and the electronic switch 430.

It should be noted that the resistor 426 functions as a current limiting means so that the electronic switch 430 is not destroyed by over current in the event that the lamp 422 is in an on condition and the lamp 422 is shorted to the positive power terminal 262 ("B+") or the signal paths 419a and 422a are shorted such as when the insulation on the signals paths 419a and/or 422a is rubbed through to expose a bare conductor or the lamp 422, or the signal paths 419a and 422a were incorrectly switched or exchanged when the automobile was manufactured.

The voltage regulator 260 is provided with a resistor 434, and a resistor 436 serially connected between a sense terminal 438 and the ground terminal 264. The ground terminal 264 (the ground terminal 264 may be referred to herein as a "ground") electrically communicates with the housing (not shown in FIG. 18) of the replacement alternator 70. The resistors 434 and 436 form a voltage divider connected to an input 440 of the logic control unit 380 to provide a signal to the input 440 indicative of the output of the alternator 70.

The voltage regulator 260 is further provided with a resistor 442 and a resistor 444 serially connected between a filter buffer output 446 of the logic control unit 380 and the ground terminal 264. A signal path 448 is provided between the interconnection of the resistors 442 and 444 and an undervoltage input 450 of the logic control unit 380 to set the undervoltage trigger point of the logic control unit 380. A diode 451 is provided between the signal path 394 and the ground terminal 264 to provide a current discharge path for the wire 100 which is wound on the rotor coil form 96 when the field current is switched from an on condition to an off condition.

A resistor 452 is provided between a source output 454 of the logic control unit 380 and the output 390 of the electronic switch 382 to bias the electronic switch 382. A capacitor 456 is provided substantially as shown in FIG. 18 for filtering out noise. A resistor 458 is provided between a VCC-1 terminal 460 of the logic control unit 380 and the positive power terminal 262, and a resistor 462 is provided between a VCC-3 input 464 of the logic control unit 380 and the positive power terminal 262. A resistor 466, and a resistor 468 are provided in series between the positive power terminal 262 and the ground terminal 264 to form a voltage divider. The interconnection of the resistors 466 and 468 is connected to the local sense input 384 to sense the alternator output voltage. The resistors 466 and 468 are provided to limit input current and input voltage to the logic control unit 380.

A resistor 472 and a resistor 474 are connected to form a voltage divider between a phase terminal 476 of the voltage regulator 260 and the ground terminal 264. The interconnection of the resistors 472 and 474 is connected to a phase input 478 of the logic control unit 380, substantially as shown. A resistor 480 is provided between an oscillator adjust input 482 of the logic control unit 380 and the ground terminal 264.

In one embodiment, the voltage regulator 260 can be formed with the component values illustrated in the following table.

| Component | Value |
| --- | --- |
| logic control unit 380 | MC33092DW |
| electronic switch 382 | MTD20N06HD |
| resistor 392 | 47000 Ohms |
| resistor 398 | 390000 Ohms |
| resistor 400 | 1000000 Ohms |
| resistor 402 | 130 Ohms |
| resistor 404 | 68 Ohms |
| resistor 406 | 1000 Ohms |
| resistor 408 | 13000 Ohms |
| electronic switch 410 | 2N7002LT1 |
| electronic switch 412 | BC856BLT1 |
| electronic switch 414 | MMBTA06L |
| resistor 420 | 360 Ohms |
| resistor 423 | 2000 Ohms |
| resistor 424 | 270 Ohms |
| resistor 426 | 33 Ohms |
| electronic switch 428 | MMBTA06L |
| electronic switch 430 | MMBTA06L |
| resistor 434 | 30100 Ohms |
| resistor 436 | 4640 Ohms |
| resistor 442 | 82000 Ohms |
| resistor 444 | 20000 Ohms |
| diode 451 | MURS120T3 |
| resistor 452 | 2000 Ohms |
| capacitor 456 | 0.1 micro-farads |
| resistor 458 | 270 Ohms |
| resistor 462 | 1000 Ohms |
| resistor 466 | 29400 Ohms |
| resistor 468 | 4640 Ohms |
| resistor 472 | 47000 Ohms |
| resistor 474 | 13000 Ohms |
| resistor 480 | 82000 Ohms |

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art. Thus, changes may be made in the embodiments of the invention described herein, or in the parts or the elements of the embodiments described herein, or in the steps or sequence of steps of the methods described herein, without departing from the spirit and/or the scope of the invention as defined in the following claims.

What is claimed is:

1. An alternator comprising:

a housing defining an alternator interior space and having an opening formed therethrough, the housing being sized to fit within the predetermined alternator space;

a rotor coil disposed in the alternator interior space and rotatably supported by the housing, the rotor coil generating a magnetic field;

a plurality of stator windings supported by the housing and positioned in the magnetic field for generating an AC output signal;

a voltage regulator disposed in the alternator interior space, the voltage regulator being electrically connected to the rotor coil for controlling the intensity of the magnetic field;

a rectifier having an input and an output, the input of the rectifier being electrically connected to the stator windings such that the input of the rectifier receives the AC output signal generated by the stator windings;

first clamping means for exerting a first clamping force between the voltage regulator and the rectifier so as to clamp the voltage regulator and the rectifier together;

an elongated shaft having a first end, a second end and a first end portion extending from the first end of the elongated shaft towards the second end of the elongated shaft, the first end portion being disposed through the opening in the housing and the elongated shaft being electrically and mechanically connected to the output of the rectifier; and second clamping means for exerting a second clamping force between the housing and the rectifier to clamp the rectifier to the housing.

2. The alternator of claim 1 wherein the rectifier has an opening formed therethrough, and wherein the elongated shaft has a medial portion extending from the first end portion of the elongated shaft towards the second end of the elongated shaft, the medial portion of the elongated shaft being matingly disposed in the opening formed in the rectifier to provide a press fit connection between the elongated shaft and the rectifier.

3. The alternator of claim 2 wherein the medial portion of the elongated shaft is knurled.

4. The alternator of claim 1 wherein the voltage regulator has an opening formed therethrough, and wherein the elongated shaft has a second end portion extending from the medial portion of the elongated shaft towards the second end of the elongated shaft, the second end portion being disposed in the opening formed in the voltage regulator.

5. An alternator constructed to replace an existing alternator in a vehicle where the existing alternator was disposed in a predetermined alternator space within the vehicle, the alternator space having a predetermined length, width and height, the alternator comprising:

a housing defining an alternator interior space, the housing being sized to fit within the predetermined alternator space;

a rotor coil disposed in the alternator interior space of the housing and rotatably supported by the housing, the rotor coil having a plurality of wire windings wound thereabout, the wire windings of the rotor coil having an electrical current flowing therethrough for generating a rotating magnetic field as the rotor coil rotates;

means for selectively rotating the rotor coil at a speed of at least 1600 revolutions per minute;

a stator positioned in the rotating magnetic field generated by the rotor coil and supported by the housing, the stator having a first side, a second side and a plurality of slots formed between the first side of the stator and the second side of the stator;

a plurality of stator windings wound through the slots of the stator in a predetermined manner to form an output of the alternator whereby the rotating magnetic field induces an electrical current in the stator windings; and means for inducing a sufficient amount of current in the stator windings at about 1600 revolutions per minute of the rotor coil to provide a stabilized current output in the stator windings of at least 43 amperes.

6. The alternator of claim 5 wherein the means for inducing a sufficient amount of current in the stator windings comprises providing at least about 12 turns of wire per each slot on the stator and providing from about 320 to about 340 turns of wire on the rotor coil wherein the gauge of wire wound on the stator and the gauge of wire wound on the rotor coil are sufficient to provide a stabilized current output of at least about 43 amperes of current at about 1600 revolutions per minute of the rotor coil.

7. The alternator of claim 6 wherein the means for inducing a sufficient amount of current in the stator windings comprises providing about 14 gauge of wire on the stator and about 19 gauge of wire on the rotor.

8. The alternator of claim 5 wherein the wire wound through the slots of the stator is looped between the slots of the stator to form a plurality of first wire loop portions extending a distance outwardly beyond the first side of the stator and a plurality of second wire loop portions extending a distance outwardly beyond the second side of the stator so that the distance between an outermost portion of the first wire loop portions and an outermost portion of the second wire loop portions is less than about 55.50 millimeters.

9. The alternator of claim 5 wherein the stator has an outside diameter of from about 131.50 millimeters to about 132.50 millimeters.

10. The alternator of claim 5 wherein the means for inducing comprises providing 12 turns of at least about 14 gauge wire per each slot on the stator.

11. A battery terminal constructed to replace an existing battery terminal of an alternator, the alternator including a housing defining an alternator interior space, a voltage regulator and a rectifier having an output, the housing of the alternator having an opening formed therethrough and the voltage regulator and the rectifier being disposed in the alternator interior space, the battery terminal comprising:

an elongated shaft having a first end, a second end and a first end portion extending from the first end of the elongated shaft towards the second end of the elongated shaft, the first end portion of the elongated shaft configured to be disposed through the opening in the housing and the elongated shaft configured to be electrically and mechanically connected to the output of the rectifier;

first clamping means on the elongated shaft for exerting a first clamping force between the housing and the rectifier so as to clamp the rectifier to the housing; and second clamping means on the elongated shaft for exerting a second clamping force between the voltage regulator and the rectifier so as to clamp the voltage regulator and the rectifier together.

12. The battery terminal of claim 11 wherein the elongated shaft has a medial portion extending from the first end portion towards the second end of the elongated shaft, the medial portion being configured to be received by an opening formed in the rectifier to provide a press fit connection between the elongated shaft and the rectifier.

13. The battery terminal of claim 12 wherein the medial portion of the elongated shaft is knurled.

14. The battery terminal of claim 12 wherein the elongated shaft has a second end portion extending from the medial portion towards the second end of the elongated shaft, the second end portion being configured to be received by an opening formed in the voltage regulator.

* * * * *

UNITED STATES PATENT AND TRADEMARK OFFICE
CERTIFICATE OF CORRECTION

PATENT NO. : 5,998,891
DATED : December 7, 1999
INVENTOR(S) : Jianing Chen et al.

It is certified that error appears in the above-identified patent and that said Letters Patent is hereby corrected as shown below:

In the Drawings:
Fig. 2B, delete the numeral "112" and substitute therefor -- 111 --, as shown.

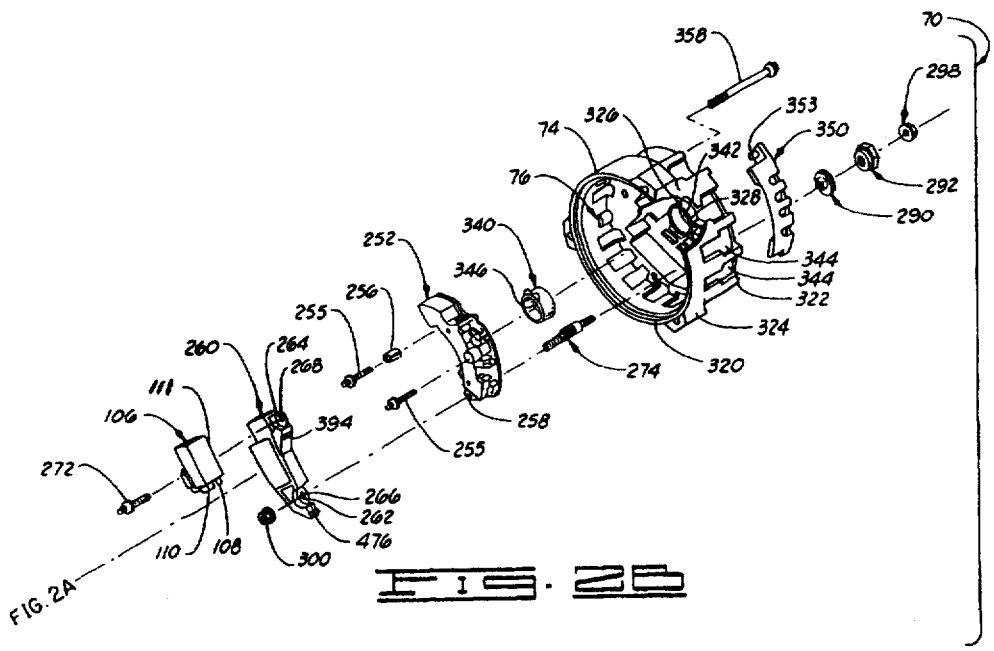

UNITED STATES PATENT AND TRADEMARK OFFICE
CERTIFICATE OF CORRECTION

PATENT NO. : 5,998,891
DATED : December 7, 1999
INVENTOR(S) : Jianing Chen et al.

Page 2 of 7

It is certified that error appears in the above-identified patent and that said Letters Patent is hereby corrected as shown below:

Fig. 6, delete the numeral "186" and substitute therefor -- 186b --, as shown.

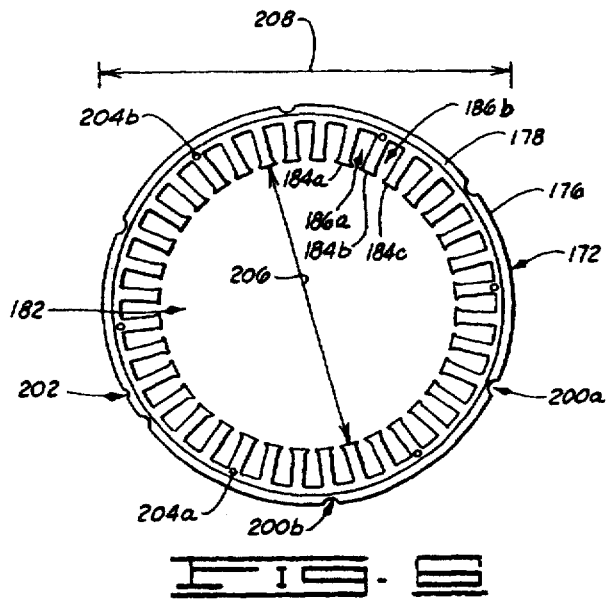

FIG. 6

UNITED STATES PATENT AND TRADEMARK OFFICE
CERTIFICATE OF CORRECTION

PATENT NO.    : 5,998,891
DATED         : December 7, 1999
INVENTOR(S)   : Jianing Chen et al.

It is certified that error appears in the above-identified patent and that said Letters Patent is hereby corrected as shown below:

Fig. 8, add the numerals -- 254a --, -- 254b --, and -- 254c --, as shown.

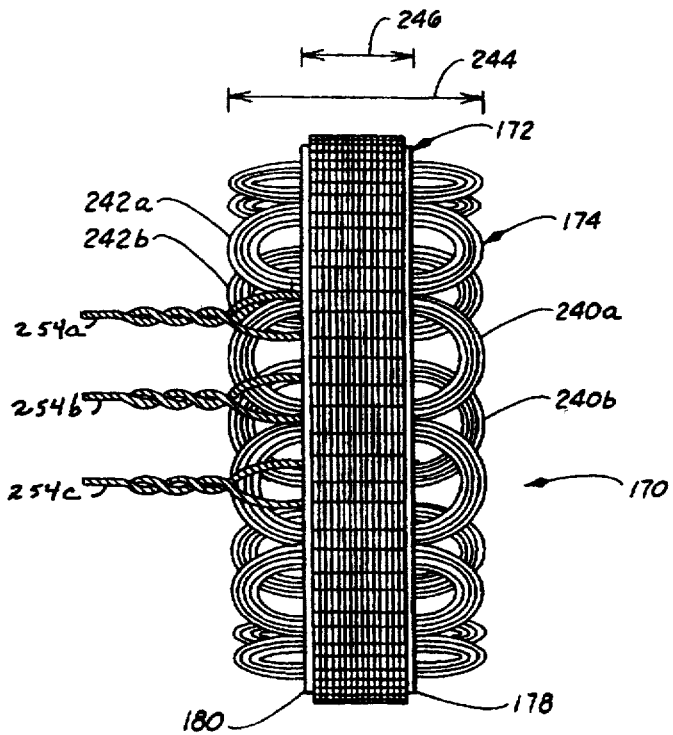

UNITED STATES PATENT AND TRADEMARK OFFICE
CERTIFICATE OF CORRECTION

PATENT NO. : 5,998,891
DATED : December 7, 1999
INVENTOR(S) : Jianing Chen et al.

It is certified that error appears in the above-identified patent and that said Letters Patent is hereby corrected as shown below:

Fig. 15, add the numeral -- 312 --, as shown.

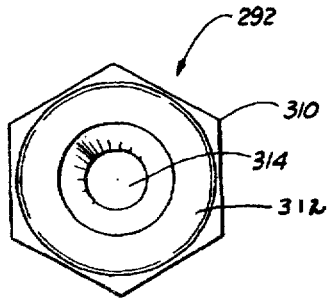

FIG. 15

UNITED STATES PATENT AND TRADEMARK OFFICE
CERTIFICATE OF CORRECTION

PATENT NO. : 5,998,891
DATED : December 7, 1999
INVENTOR(S) : Jianing Chen et al.

It is certified that error appears in the above-identified patent and that said Letters Patent is hereby corrected as shown below:

Fig. 18, delete the numeral "415" (all occurrences), and substitute therefor -- 264 -- (all occurrences); delete the numeral "397" and substitute therefor -- 262 --, as shown.

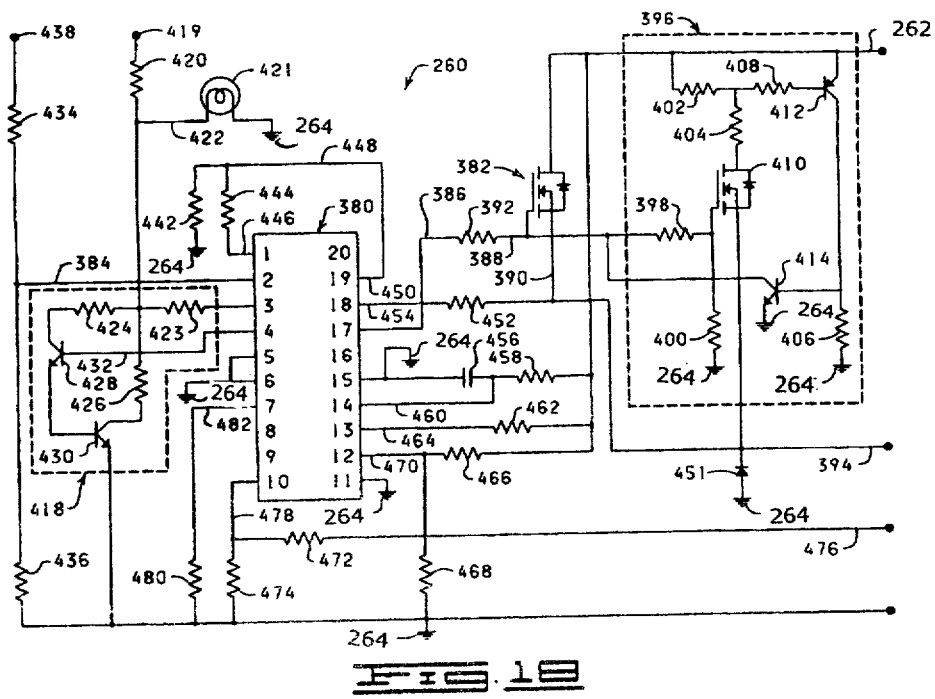

FIG. 18

UNITED STATES PATENT AND TRADEMARK OFFICE
CERTIFICATE OF CORRECTION

PATENT NO. : 5,998,891
DATED : December 7, 1999
INVENTOR(S) : Jianing Chen et al.

It is certified that error appears in the above-identified patent and that said Letters Patent is hereby corrected as shown below:

In the Description:
Column 5:
Line 24, delete "air vents 22" and substitute -- air vents 20 -- therefor ;
Line 28, delete "air vents 20" and substitute -- air vents 22 -- therefor;

Column 7:
Line 34, delete "4)" and substitute therefor -- 4A-4C) --;

Column 10:
Line 28, delete "(FIG. 6)," and substitute -- (FIGS. 6 and 7), -- therefor;
Lines 28-29, delete "(FIG. 8)," and substitute -- (FIGS. 6 and 8), -- therefor ;
Line 32, delete "(FIG. 6)" and substitute -- (FIGS. 6 and 7) -- therefor;
Line 34, delete "(FIG. 6)" and substitute -- (FIGS. 6 and 7) -- therefor;
Line 58, delete "are" and substitute -- is -- therefor;

Column 11:
Line 4, delete "pair of" and substitute -- of the -- therefor;
Line 5, delete "are" and substitute -- is -- therefor;
Line 31, delete "alternator." and substitute -- alternator 10. -- therefor ;
Line 57, delete "is" and substitute -- are -- therefor;

Column 12:
Lines 63-64, delete "FIG. 2A" and substitute -- FIGS. 2A and 8 -- therefor;

Column 13:
Line 60, after "11," and before "14," insert -- 12, --;

Column 15:
Line 29, delete "end 336" and substitute -- ends 336 -- therefor;
Line 33, delete "end 336" and substitute -- ends 336 -- therefor;

Column 17:
Line 56, delete "on" and substitute therefor -- "on" --;

UNITED STATES PATENT AND TRADEMARK OFFICE
CERTIFICATE OF CORRECTION

PATENT NO. : 5,998,891
DATED : December 7, 1999
INVENTOR(S) : Jianing Chen et al.

It is certified that error appears in the above-identified patent and that said Letters Patent is hereby corrected as shown below:

Column 19:
Line 16, delete "431";
Line 17, delete "path 419a." and substitute -- path. -- therefor;
Line 18, delete "421" ;
Line 19, delete "422" and substitute -- 421 -- therefor;
Line 20, delete "422a." and substitute -- 422. -- therefor;
Line 23, delete "lamp terminal" and substitute therefor -- indicator lamp -- ;
Line 26, delete "431";
Line 26, delete "lamp 422" and substitute -- indicator lamp 421 -- therefor ;
Line 29, delete "431";
Line 38, delete "lamp 422," and substitute -- indicator lamp 421, -- therefor;
Line 42, delete "lamp 422" and substitute -- indicator lamp 421-- therefor;
Line 43, delete "lamp 422," and substitute -- indicator lamp 421, -- therefor;
Lines 44-45, delete "419a and 422a" and substitute therefor -- 419 and 422 --therefor;
Line 46, delete "419a and/or 422a" and substitute therefor -- 419 and/or 422 -- therefor;;
Line 47, delete "lamp 422," and substitute -- indicator lamp 421, -- therefor;
Lines 47-48, delete "419a and 422a" and substitute therefor -- 419 and 422 -- therefor;
Line 57, delete "an input 440" and substitute -- the local sense input 384 -- ;
Line 58, delete "input 440" and substitute -- local sense input 384 --;

Column 20:
Line 17, delete " the local sense input 384" and substitute -- a local supply regulation 470 -- therefor.

Signed and Sealed this

Eighteenth Day of September, 2001

*Attest:*

*Attesting Officer*

NICHOLAS P. GODICI
Acting Director of the United States Patent and Trademark Office